(12) United States Patent
Zhou

(10) Patent No.: US 9,491,405 B2
(45) Date of Patent: Nov. 8, 2016

(54) METHOD AND APPARATUS FOR DISPLAYING CONFERENCE MATERIAL IN VIDEO CONFERENCE

(71) Applicant: Huawei Technologies Co., Ltd., Shenzhen (CN)

(72) Inventor: Zhentao Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/856,755

(22) Filed: Sep. 17, 2015

(65) Prior Publication Data

US 2016/0006984 A1 Jan. 7, 2016

Related U.S. Application Data

(63) Continuation of application No. PCT/CN2013/085260, filed on Oct. 15, 2013.

(30) Foreign Application Priority Data

Apr. 22, 2013 (CN) .......................... 2013 1 0140460

(51) Int. Cl.
*H04N 7/15* (2006.01)
*G06K 9/62* (2006.01)
(Continued)

(52) U.S. Cl.
CPC .............. *H04N 7/15* (2013.01); *G06K 9/6201* (2013.01); *G06T 7/004* (2013.01); *G06T 7/0079* (2013.01); *H04N 5/265* (2013.01); *H04N 7/152* (2013.01)

(58) Field of Classification Search
CPC ........ H04N 7/15; H04N 5/265; H04N 7/152; G06K 9/6201; G06T 7/0079; G06T 7/004
See application file for complete search history.

(56) References Cited

U.S. PATENT DOCUMENTS

2003/0160862 A1* 8/2003 Charlier ............. H04N 5/23238
348/14.08
2005/0264648 A1 12/2005 Ivashin et al.
(Continued)

FOREIGN PATENT DOCUMENTS

CN 101826168 A 9/2010
CN 101828392 A 9/2010
(Continued)

OTHER PUBLICATIONS

Partial English Translation and Abstract of Chinese Patent Application No. CN101826168, Sep. 16, 2015, 4 pages.
(Continued)

*Primary Examiner* — Stella Woo
(74) *Attorney, Agent, or Firm* — Conley Rose, P.C.

(57) ABSTRACT

A method and an apparatus for displaying a conference material in a video conference. The method includes determining a position coordinate of a first specified user at a conference site; collecting a video image signal of the conference site, segmenting the video image signal of the conference site according to the position coordinate to acquire a video image signal of the first specified user, and acquiring a video data signal of a displayed conference material; and synthesizing the video image signal of the first specified user and the video data signal of the conference material into one channel of encoded video signal, and sending the channel of encoded video signal to another conference site for signal decoding and for displaying on a same display screen at the other conference site.

17 Claims, 13 Drawing Sheets

(51) Int. Cl.
*G06T 7/00* (2006.01)
*H04N 5/265* (2006.01)

(56) References Cited

U.S. PATENT DOCUMENTS

| | | | |
|---|---|---|---|
| 2009/0309897 A1 | 12/2009 | Morita et al. | |
| 2010/0208139 A1 | 8/2010 | Hii | |
| 2011/0242277 A1 | 10/2011 | Do et al. | |
| 2012/0200658 A1* | 8/2012 | Duckworth | H04N 7/152 348/14.07 |
| 2012/0306992 A1* | 12/2012 | Watson | H04N 7/147 348/14.07 |
| 2013/0147901 A1* | 6/2013 | Weiser | H04L 65/1006 348/14.08 |
| 2013/0198629 A1* | 8/2013 | Tandon | H04M 3/567 715/716 |
| 2013/0328998 A1 | 12/2013 | Duckworth et al. | |
| 2014/0028781 A1* | 1/2014 | MacDonald | G06Q 10/10 348/14.07 |
| 2014/0063177 A1* | 3/2014 | Tian | H04N 7/15 348/14.07 |
| 2014/0098174 A1* | 4/2014 | Summers | H04N 7/15 348/14.1 |
| 2014/0232814 A1* | 8/2014 | Malhotra | H04N 7/15 348/14.07 |
| 2015/0029301 A1* | 1/2015 | Nakatomi | H04N 7/15 348/14.08 |

FOREIGN PATENT DOCUMENTS

| | | |
|---|---|---|
| CN | 102638672 A | 8/2012 |
| JP | 2010157906 A | 7/2010 |

OTHER PUBLICATIONS

Foreign Communication From a Counterpart Application, PCT Application No. PCT/CN2013/085260, English Translation of International Search Report dated Jan. 23, 2014, 2 pages.
Foreign Communication From a Counterpart Application, PCT Application No. PCT/CN2013/085260, English Translation of Written Opinion dated Jan. 23, 2014, 11 pages.
Partial English Translation and Abstract of Japanese Patent Application No. JP2010157906, Mar. 16, 2016, 2 pages.
"User Guide TANDBERG MXP Series, Video Endpoints," Retrieved from the Internet: URL:http://www.its.swnburne.edu.au/staff/guides/telecomms/Tandberg User Guide.pdf [retrieved on Feb. 4, 2016], May 2011, 53 pages.
Foreign Communication From a Counterpart Application, European Application No. 13882946.0, Extended European Search Report dated Feb. 12, 2016, 11 pages.

* cited by examiner

METHOD AND APPARATUS FOR DISPLAYING CONFERENCE MATERIAL IN VIDEO CONFERENCE

CROSS-REFERENCE TO RELATED APPLICATIONS

This application is a continuation of International Application No. PCT/CN2013/085260, filed on Oct. 15, 2013, which claims priority to Chinese Patent Application No. 201310140460.X, filed on Apr. 22, 2013, both of which are hereby incorporated by reference in their entireties.

TECHNICAL FIELD

The present disclosure relates to the field of video communication technologies, and in particular, to a method and an apparatus for displaying a conference material in a video conference.

BACKGROUND

With the development of video encoding and network technologies, there is an increasing tendency for wide application of network videos. One application manner of network videos is videoconferencing. A videoconferencing technology is a technology in which corresponding compression processing is performed after site information of a party participating in communication is collected using video and audio collection devices and digitized, and then a digital signal is transferred through an available communication channel/line to a remote end for decompression, restoration, and reproduction. That is, a video conference is a conference that integrates a video, audio, and data communication, and images and sounds of conference sites can be transmitted in real time so that the conference sites are in one conference logically but are not within one area physically. Compared with a conventional conference, a video conference is highly efficient and cost-effective, and has advantages such as an effect of simulating a real scenario, which not only can resolve an issue of long-distance communication, but also satisfies a requirement of users for face-to-face communication; therefore, video conferences are more widely applied in companies. FIG. 1A is a schematic structural diagram of a videoconferencing system in the prior art. The videoconferencing system includes a multi-point control unit (MCU) and a conference endpoint.

At present, each conference site in a videoconferencing system has at least one conference endpoint. A specific structure of a videoconferencing system is shown in FIG. 1B. Each conference endpoint collects and encodes a sound and an image of a conference site of the conference endpoint and sends the encoded sound and image to an MCU; the MCU sends the processed sound and image and a conference material to other conference endpoints in a video conference; and each of the other conference endpoints decodes and outputs the sound and image of the remote conference site and the conference material, thereby implementing remote video communication. There are two manners for displaying a conference material.

One manner is that there are multiple desktop material display screens in a videoconferencing system, a main display screen that displays conference participants is separated from the desktop material display screens that display a conference material, and one or more conference participants share one desktop material display screen. For details, refer to FIG. 1C. A main function of the desktop material display screen is to demonstrate various electronic materials in a remote conference.

The other manner is that there is one material display screen in a videoconferencing system, a main display screen that displays conference participants is separated from the material display screen that displays a conference material, and all conference participants at one conference site share one material display screen. For details, refer to FIG. 1D. A main function of the material display screen is to demonstrate various electronic materials in the conference.

During the foregoing process of implementing a conventional video conference, a system for implementing the video conference requires one main display screen that displays conference participants and at least one material display screen that displays a conference material, and the main display screen is separated from the material display screen. During the implementation process, the two types of devices need to be operated separately. Because the two types of display screen devices are separated, the videoconferencing system cannot be moved easily and has relatively poor flexibility. In addition, the two types of display screen devices are usually placed at different positions of a conference site, and connection lines in and between the display screen devices are large in quantity and complex, so that arrangement of the conference site is restricted and a fault easily occurs in the connection lines; therefore, a high maintenance requirement is imposed. Further, a keynote speaker and the conference material are not on a same screen. Another conference participant who needs to pay attention to the keynote speaker and the conference material at the same time needs to constantly shift a line of sight within a relatively wide range between the keynote speaker and the conference material. As a result, conference efficiency is relatively low, and user experience is affected.

SUMMARY

Embodiments of the present disclosure provide a method for displaying a conference material in a remote conference, which is used to resolve problems in the prior art that a videoconferencing system cannot be moved easily and has relatively poor flexibility and relatively high maintenance costs, and that conference efficiency is relatively low.

According to a first aspect, a method for displaying a conference material in a video conference is provided, including determining a position coordinate of a first specified user at a conference site; collecting a video image signal of the conference site, and segmenting, according to the position coordinate, the video image signal of the conference site to acquire a video image signal of the first specified user; and acquiring a video data signal of a displayed conference material, synthesizing the video image signal of the first specified user and the video data signal of the conference material into one channel of encoded video signal, and sending the channel of encoded video signal to another conference site for signal decoding and for displaying on a same display screen at the another conference site.

With reference to the first aspect, in a first possible implementation manner, the method further includes determining a position coordinate of at least one second specified user, who is at the same conference site as the first specified user, at the conference site; and segmenting the video image signal of the conference site according to the determined the position coordinate of the at least one second specified user to acquire a video image signal of each second specified user; and the synthesizing the video image signal of the first specified user and the video data signal of the conference material into one channel of encoded video signal includes synthesizing the video image signals of the first specified user and the at least one second specified user and the video data signal of the conference material into one channel of encoded video signal.

With reference to the first aspect or the first possible implementation manner of the first aspect, in a second possible implementation manner, the method further includes determining the position coordinate of the specified user at the conference site by means of a sound localization technology; or determining, based on a locator, the position coordinate of the specified user at the conference site.

With reference to the first aspect or the first possible implementation manner of the first aspect, in a third possible implementation manner, the segmenting the video image signal of the conference site according to the position coordinate to acquire the video image signal of the specified user includes matching the position coordinate with spatial position coordinates of the video image signal of the conference site to obtain a position of the video image signal of the specified user in the video image signal of the conference site; determining a video image of the specified user according to a video image signal at the position by means of a facial recognition technology; and segmenting the video image signal of the conference site at a preset distance from the image of the specified user to acquire the video image signal of the specified user.

According to a second aspect, a method for displaying a conference material in a video conference is provided, including receiving a video image signal of a first specified user and a video data signal of a conference material that are sent from another conference site; synthesizing, into one channel of encoded video signal, the video image signal of the first specified user and the video data signal of the conference material that are received; and decoding the synthesized encoded video signal, and displaying the decoded signal on a same display screen at a local conference site.

With reference to the second aspect, in a first possible implementation manner, the method further includes receiving a video image signal, which is sent from the another conference site, of at least one second specified user at the same conference site as the first specified user; and the synthesizing, into one channel of encoded video signal, the video image signal of the first specified user and the video data signal of the conference material that are received includes separately synthesizing, into one channel of encoded video signal, the video image signal of the first specified user, the video image signal of the at least one second specified user, and the video data signal of the conference material that are received.

According to a third aspect, a method for displaying a conference material in a video conference is provided, including obtaining one channel of encoded video signal into which a video image signal of a first specified user and a video data signal of a conference material are synthesized; decoding the obtained channel of encoded video signal, and virtually segmenting a display screen at a local conference site into a preset quantity of display subscreens; and displaying a video image, which is obtained through decoding, of the conference material on at least one display subscreen obtained through segmentation in the display screen, and displaying a video image, which is obtained through decoding, of the first specified user on another at least one display subscreen obtained through segmentation in the display screen.

With reference to the third aspect, in a first possible implementation manner, the obtained channel of encoded video signal further includes a video image signal of at least one second specified user; and the method further includes displaying a video image, which is obtained through decoding, of the at least one second specified user on the another at least one display subscreen obtained through segmentation.

With reference to the third aspect, in a second possible implementation manner, the displaying a video image, which is obtained through decoding, of the conference material on at least one display subscreen obtained through segmentation in the display screen includes displaying the video image, which is obtained through decoding, of the conference material on at least two adjacent display subscreens obtained through segmentation in the display screen.

With reference to the third aspect or the first possible implementation manner of the third aspect, in a third possible implementation manner, the displaying the video image, which is obtained through decoding, of the specified user on the another at least one display subscreen obtained through segmentation in the display screen includes displaying a video image, which is obtained through decoding, of each specified user on any display subscreen obtained through segmentation in the display screen; or displaying video images, which are obtained through decoding, of at least two specified users on any display subscreen obtained through segmentation in the display screen.

With reference to the third aspect, in a fourth possible implementation manner, the displaying a video image, which is obtained through decoding, of the conference material on at least one display subscreen obtained through segmentation in the display screen, and displaying a video image, which is obtained through decoding, of the first specified user on another at least one display subscreen obtained through segmentation in the display screen includes displaying the video image, which is obtained through decoding, of the first specified user on a display subscreen that is selected from all display subscreens and that is obtained through segmentation in the display screen; and displaying the video image, which is obtained through decoding, of the conference material on a display subscreen that is adjacent to the selected display subscreen and is close to a central area of the display screen.

With reference to the third aspect or the first possible implementation manner of the third aspect, in a fifth possible implementation manner, the method further includes, when a role of a second specified user is changed to a role of the first specified user, determining at least one display subscreen adjacent to a display subscreen displaying a video image of the second specified user whose role is changed; and displaying, in an interchanging manner, a video image in the at least one display subscreen, which originally displays the video image of the conference material, and a video image in the determined at least one display subscreen.

With reference to the third aspect or the first possible implementation manner of the third aspect, in a sixth possible implementation manner, the method further includes, when a second specified user speaks, determining at least one display subscreen that is adjacent to the display subscreen displaying the video image of the conference material and is different from the display subscreen displaying the video image of the first specified user; and displaying, in an interchanging manner, a video image in a display subscreen, which originally displays a video image of the second specified user who speaks, and a video image in the determined at least one display subscreen.

According to a fourth aspect, an apparatus for displaying a conference material in a video conference is provided, including a determining unit configured to determine a position coordinate of a first specified user at a conference site; an image signal acquiring unit configured to collect a video image signal of the conference site, segment the video image signal of the conference site according to the position coordinate determined by the determining unit to acquire a video image signal of the first specified user, and acquire a video data signal of a displayed conference material; and a communications unit configured to synthesize the video image signal of the first specified user and the video data signal of the conference material that are acquired by the image signal acquiring unit into one channel of encoded video signal, and send the channel of encoded video signal to another conference site for signal decoding and for displaying on a same display screen at the another conference site.

With reference to the fourth aspect, in a first possible implementation manner, the determining unit is further configured to determine a position coordinate of at least one second specified user, who is at the same conference site as the first specified user, at the conference site; the image signal acquiring unit is further configured to segment the video image signal of the conference site according to the position coordinate, which are determined by the determining unit, of the at least one second specified user to acquire a video image signal of each second specified user; and the communications unit is configured to synthesize the video image signals of the first specified user and the at least one second specified user and the video data signal of the conference material that are separately acquired by the image signal acquiring unit into one channel of encoded video signal, and send the channel of encoded video signal to another conference site for signal decoding and for displaying on a same display screen at the another conference site.

With reference to the fourth aspect or the first possible implementation manner of the fourth aspect, in a second possible implementation manner, the determining unit is configured to determine the position coordinate of the specified user at the conference site by means of a sound localization technology; or determine, based on a locator, the position coordinate of the specified user at the conference site.

With reference to the fourth aspect or the first possible implementation manner of the fourth aspect, in a third possible implementation manner, the image signal acquiring unit is configured to match the position coordinate with spatial position coordinates of the video image signal of the conference site to obtain a position of the video image signal of the specified user in the video image signal of the conference site; determine a video image of the specified user according to a video image signal at the position by means of a facial recognition technology; and segment the video image signal of the conference site at a preset distance from the image of the specified user to acquire the video image signal of the specified user.

According to a fifth aspect, a conference endpoint is provided, including an image signal processor configured to determine a position coordinate of a first specified user at a conference site, collect a video image signal of the conference site, segment the video image signal of the conference site according to the position coordinate to acquire a video image signal of the first specified user, and acquire a video data signal of a displayed conference material; an image signal multiplexer configured to synthesize the video image signal of the first specified user and the video data signal of the conference material that are acquired by the image signal processor into one channel of encoded video signal; and a signal transceiver configured to send the channel of encoded video signal synthesized by the image signal multiplexer to another conference site for signal decoding and for displaying on a same display screen at the another conference site.

With reference to the fifth aspect, in a first possible implementation manner, the image signal processor is further configured to determine a position coordinate of at least one second specified user, who is at the same conference site as the first specified user, at the conference site; and segment the video image signal of the conference site according to the determined the position coordinate of the at least one second specified user to acquire a video image signal of each second specified user; and the image signal multiplexer is configured to synthesize the video image signals of the first specified user and the at least one second specified user and the video data signal of the conference material that are separately acquired by the image signal processor into one channel of encoded video signal.

With reference to the fifth aspect or the first possible implementation manner of the fifth aspect, in a second possible implementation manner, the image signal processor is configured to determine the position coordinate of the specified user at the conference site by means of a sound localization technology; or determine, based on a locator, the position coordinate of the specified user at the conference site.

With reference to the fifth aspect or the first possible implementation manner of the fifth aspect, in a third possible implementation manner, the image signal processor is configured to match the position coordinate with spatial position coordinates of the video image signal of the conference site to obtain a position of the video image signal of the specified user in the video image signal of the conference site; determine a video image of the specified user according to a video image signal at the position by means of a facial recognition technology; and segment the video image signal of the conference site at a preset distance from the image of the specified user to acquire the video image signal of the specified user.

According to a sixth aspect, an apparatus for displaying a conference material in a video conference is provided, including a communications unit configured to receive a video image signal of a first specified user and a video data signal of a conference material that are sent from another conference site, and synthesize, into one channel of encoded video signal, the video image signal of the first specified user and the video data signal of the conference material that are received; and a presentation unit configured to decode the encoded video signal synthesized by the communications unit, and display the decoded signal on a same display screen at a local conference site.

With reference to the sixth aspect, in a first possible implementation manner, the communications unit is further configured to receive a video image signal, which is sent from the another conference site, of at least one second specified user at the same conference site as the first specified user, and synthesize the received video image signal of the at least one second specified user into the synthesized channel of encoded video signal.

According to a seventh aspect, a conference endpoint is provided, including a signal transceiver configured to receive a video image signal of a first specified user and a video data signal of a conference material that are sent from another conference site; an image signal multiplexer configured to synthesize, into one channel of encoded video signal, the video image signal of the first specified user and the video data signal of the conference material that are received by the signal transceiver; and a display configured to decode the encoded video signal synthesized by the image signal multiplexer, and display the decoded signal on a same display screen at a local conference site.

With reference to the seventh aspect, in a first possible implementation manner, the signal transceiver is further configured to receive a video image signal, which is sent from the another conference site, of at least one second specified user at the same conference site as the first specified user; and the image signal multiplexer is configured to synthesize, into one channel of encoded video signal, the video image signals of the first specified user and the at least one second specified user and the video data signal of the conference material that are received by the signal transceiver.

According to an eighth aspect, an apparatus for displaying a conference material in a video conference is provided, including a signal decoding unit configured to obtain one channel of encoded video signal into which a video image signal of a first specified user and a video data signal of a conference material are synthesized, and decode the obtained channel of encoded video signal; a screen segmentation unit configured to virtually segment a display screen at a local conference site into a preset quantity of display subscreens; and a presentation unit configured to display a video image, which is obtained by the signal decoding unit through decoding, of the conference material on at least one display subscreen obtained by the screen segmentation unit through segmentation, and display a video image, which is obtained by the signal decoding unit through decoding, of the first specified user on another at least one display subscreen obtained by the screen segmentation unit through segmentation.

With reference to the eighth aspect, in a first possible implementation manner, the channel of encoded video signal obtained by the signal decoding unit further includes a video image signal of at least one second specified user; and the presentation unit is further configured to display a video image, which is obtained by the signal decoding unit through decoding, of the at least one second specified user on another at least one display subscreen obtained by the screen segmentation unit through segmentation.

With reference to the eighth aspect, in a second possible implementation manner, the presentation unit is configured to display the video image, which is obtained by the signal decoding unit through decoding, of the conference material on at least two adjacent display subscreens obtained by the screen segmentation unit through segmentation.

With reference to the first possible implementation manner of the eighth aspect, in a third possible implementation manner, the presentation unit is configured to display a video image, which is obtained by the signal decoding unit through decoding, of each specified user on any display subscreen obtained by the screen segmentation unit through segmentation; or display video images, which are obtained by the signal decoding unit through decoding, of at least two specified users on any display subscreen obtained by the screen segmentation unit through segmentation.

With reference to the eighth aspect, in a fourth possible implementation manner, the presentation unit is configured to display the video image, which is obtained by the signal decoding unit through decoding, of the first specified user on any display subscreen obtained by the screen segmentation unit through segmentation; and display the video image, which is obtained by the signal decoding unit through decoding, of the conference material on a display subscreen that is adjacent to the selected display subscreen and is close to a central area of the display screen.

With reference to the first possible implementation manner of the eighth aspect, in a fifth possible implementation manner, the presentation unit is further configured to, when a role of a second specified user is changed to a role of the first specified user, determine at least one display subscreen adjacent to a display subscreen displaying a video image of the second specified user whose role is changed; and display, in an interchanging manner, a video image in the at least one display subscreen, which originally displays the video image of the conference material, and a video image in the determined at least one display subscreen.

With reference to the first possible implementation manner of the eighth aspect, in a sixth possible implementation manner, the presentation unit is further configured to, when a second specified user speaks, determine at least one display subscreen that is adjacent to the display subscreen displaying the video image of the conference material and is different from the display subscreen displaying the video image of the first specified user; and display, in an interchanging manner, a video image in a display subscreen, which originally displays a video image of the second specified user who speaks, and a video image in the determined at least one display subscreen.

According to a ninth aspect, a conference endpoint is provided, including a signal transceiver configured to obtain one channel of encoded video signal into which a video image signal of a first specified user and a video data signal of a conference material are synthesized; a signal decoder configured to decode the channel of encoded video signal obtained by the signal transceiver; and a processor configured to virtually segment a display screen at a local conference site into a preset quantity of display subscreens; display a video image, which is obtained by the signal decoder through decoding, of the conference material on at least one display subscreen obtained through segmentation; and display a video image, which is obtained by the signal decoder through decoding, of the first specified user on another at least one display subscreen obtained through segmentation.

With reference to the ninth aspect, in a first possible implementation manner, the channel of encoded video signal obtained by the signal transceiver further includes a video image signal of at least one second specified user; and the processor is further configured to display a video image, which is obtained by the signal decoder through decoding, of the at least one second specified user on another at least one display subscreen obtained by the processor through segmentation.

With reference to the ninth aspect, in a second possible implementation manner, the processor is configured to display the video image, which is obtained by the signal decoder through decoding, of the conference material on at least two adjacent display subscreens obtained through segmentation.

With reference to the first possible implementation manner of the ninth aspect, in a third possible implementation manner, the processor is configured to display a video image, which is obtained by the signal decoder through decoding, of each specified user on any display subscreen obtained through segmentation; or display video images, which are obtained by the signal decoder through decoding, of at least two specified users on any display subscreen obtained through segmentation.

With reference to the first possible implementation manner of the ninth aspect, in a fourth possible implementation manner, the processor is configured to display the video image, which is obtained by the signal decoder through decoding, of the first specified user on any display subscreen obtained through segmentation; and display the video image, which is obtained by the signal decoder through decoding, of the conference material on a display subscreen that is adjacent to the selected display subscreen and is close to a central area of the display screen.

With reference to the first possible implementation manner of the ninth aspect, in a fifth possible implementation manner, the processor is further configured to, when a role of a second specified user is changed to a role of the first specified user, determine at least one display subscreen adjacent to a display subscreen displaying a video image of the second specified user whose role is changed; and display, in an interchanging manner, a video image in the at least one display subscreen, which originally displays the video image of the conference material, and a video image in the determined at least one display subscreen.

With reference to the first possible implementation manner of the ninth aspect, in a sixth possible implementation manner, the processor is further configured to, when a second specified user speaks, determine at least one display subscreen that is adjacent to the display subscreen displaying the video image of the conference material and is different from the display subscreen displaying the video image of the first specified user; and display, in an interchanging manner, a video image in a display subscreen, which originally displays a video image of the second specified user who speaks, and a video image in the determined at least one display subscreen.

In the embodiments of the present disclosure, three methods for displaying a conference material in a remote conference are provided.

One method includes first determining a position coordinate of a first specified user at a conference site, then collecting a video image signal of the conference site, and segmenting, according to the position coordinate, the video image signal of the conference site to acquire a video image signal of the first specified user; and then acquiring a video data signal of a displayed conference material, synthesizing the video image signal of the first specified user and the video data signal of the conference material into one channel of encoded video signal, and sending the channel of encoded video signal to another conference site for signal decoding and for displaying on a same display screen at the another conference site. In this solution, the video image signal of the first specified user and the video data signal of the conference material that are acquired are synthesized into one channel of video signal and encoded, and then the encoded video signal is sent to the another conference site and is displayed on the same display screen at the another conference site, thereby achieving an effect of displaying a video image of the first specified user and a video image of the conference material on a same display screen at a same conference site. Because only one display screen is required to display the conference material and the first specified user at the same time, problems that a videoconferencing system cannot be moved easily and has relatively high costs and relatively poor flexibility are effectively avoided. Further, when paying attention to the conference material and the first specified user at the same time, a conference participant does not need to shift a line of sight between a display screen that displays the video image of the conference material and a display screen that displays the video image of the first specified user; therefore, efficiency of a video conference is improved, and user experience is also improved.

Another method includes, after a video image signal of a first specified user and a video data signal of a conference material that are sent from another conference site are received, synthesizing, into one channel of encoded video signal, the video image signal of the first specified user and the video data signal of the conference material that are received, decoding the synthesized channel of encoded video signal, and displaying the decoded video signal on a same display screen at a local conference site. In this solution, at a conference site, the video image signal of the first specified user and the video data signal of the conference material that are received are synthesized into one channel of video signal and encoded, and the encoded video signal is displayed on the same display screen at the local conference site, thereby achieving an effect of displaying a video image of the first specified user and a video image of the conference material on a same display screen at a same conference site. Because only one display screen is required to display the conference material and the first specified user at the same time, that is, the conference material and the first specified user do not need to be displayed separately on two display screens, problems that a videoconferencing system cannot be moved easily and has relatively high costs and relatively poor flexibility due to many screens are effectively avoided. Further, when paying attention to the conference material and the first specified user at the same time, a conference participant does not need to shift a line of sight between a display screen that displays the video image of the conference material and a display screen that displays the video image of the first specified user; therefore, efficiency of a video conference is improved, and user experience is also improved.

Still another method includes obtaining one channel of encoded video signal into which a video image signal of a first specified user and a video data signal of a conference material are synthesized; decoding the obtained synthesized channel of encoded video signal, and virtually segmenting a display screen at a local conference site into a preset quantity of display subscreens; and displaying a video image, which is obtained through decoding, of the conference material on at least one display subscreen obtained through segmentation, and displaying a video image, which is obtained through decoding, of the first specified user on another at least one display subscreen obtained through segmentation. In this solution, at a conference site, after the channel of encoded video signal into which the video image signal of the first specified user and the video data signal of the conference material are synthesized is obtained, a display screen at the local conference site is virtually segmented into a preset quantity of display subscreens, the video image, which is obtained through decoding, of the conference material is displayed on at least one display subscreen obtained through segmentation, and the video image, which is obtained through decoding, of the first specified user is displayed on another at least one display subscreen obtained through segmentation, thereby achieving an effect of displaying a video image of the first specified user and a video image of the conference material on a same display screen at a same conference site. Because the conference material and the first specified user are displayed on different display subscreens of only one display screen, that is, the conference material and the first specified user do not need to be displayed separately on two display screens, problems that a videoconferencing system cannot be moved easily and has relatively high costs and relatively poor flexibility due to many screens are effectively avoided. Further, when paying attention to the conference material and the first specified user at the same time, a conference participant does not need to shift a line of sight between a display screen that displays the video image of the conference material and a display screen that displays the video image of the first specified user; therefore, efficiency of a video conference is improved, and user experience is also improved.

DESCRIPTION OF EMBODIMENTS

To resolve problems in the prior art that a videoconferencing system cannot be moved easily and has relatively poor flexibility and relatively high maintenance costs, and that conference efficiency is relatively low, embodiments of the present disclosure provide three methods for displaying a conference material in a remote conference, all of which can effectively avoid the problems that a videoconferencing system cannot be moved easily and has relatively high costs and relatively poor flexibility due to many screens. Further, when paying attention to a conference material and a first specified user at the same time, a conference participant does not need to shift a line of sight between a display screen that displays a video image of the conference material and a display screen that displays a video image of the first specified user; therefore, efficiency of a video conference is improved, and user experience is also improved.

The following describes in detail exemplary implementation manners of the present disclosure with reference to the accompanying drawings.

Figure 1A:
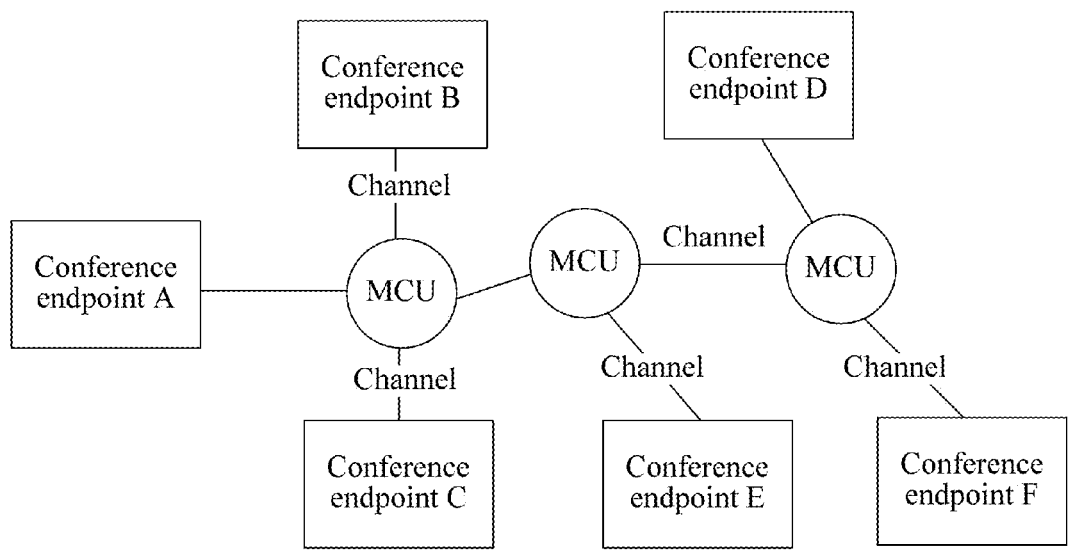
FIG. 1A is a first schematic structural diagram of a videoconferencing system in the prior art.
Figure 1B:
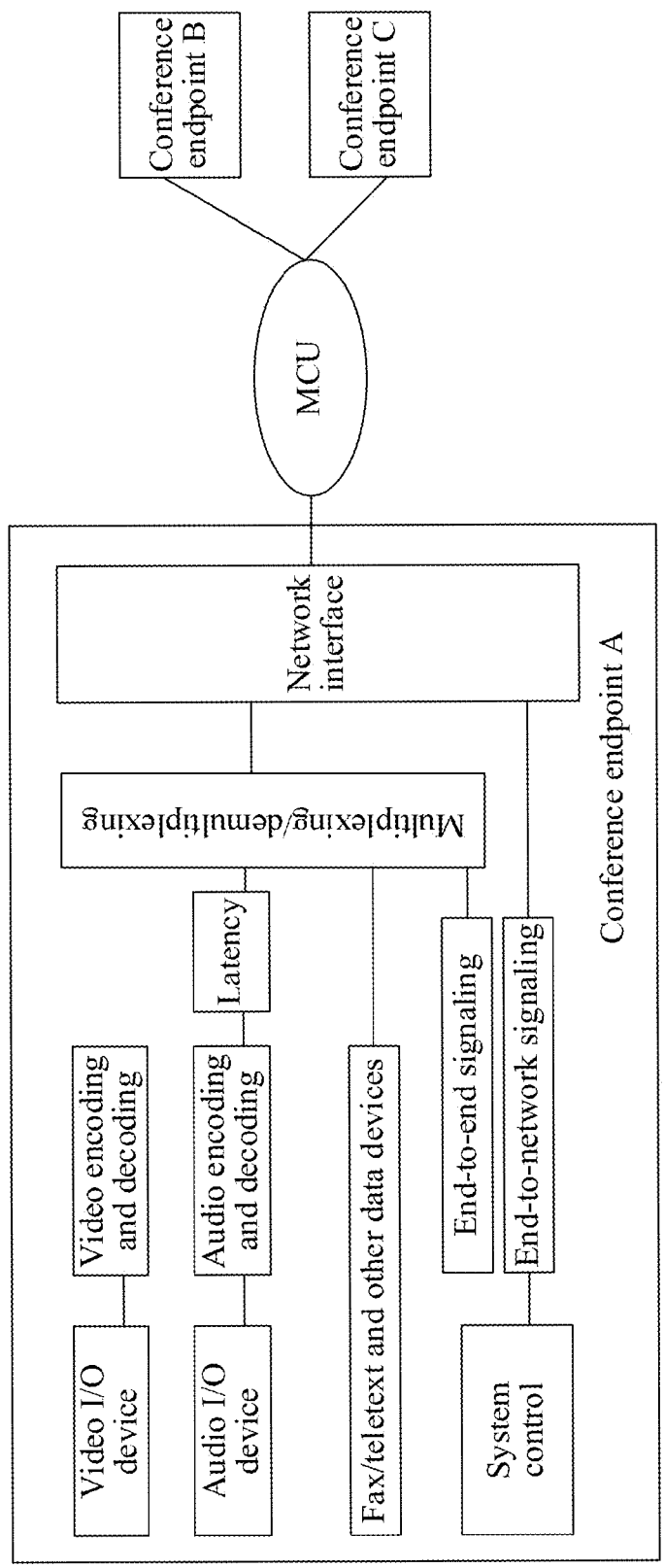
FIG. 1B is a second schematic structural diagram of a videoconferencing system in the prior art.
Figure 1C:
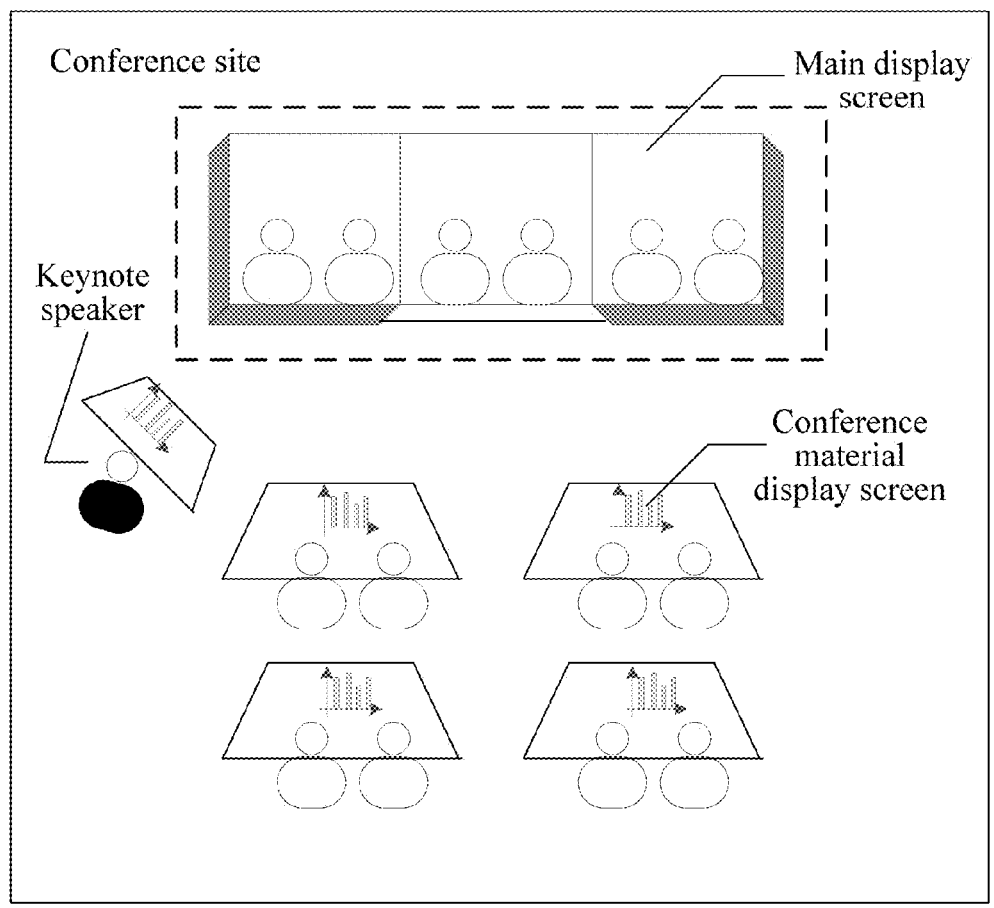
FIG. 1C is a first schematic diagram of display of a conference material in a video conference in the prior art.
Figure 1D:
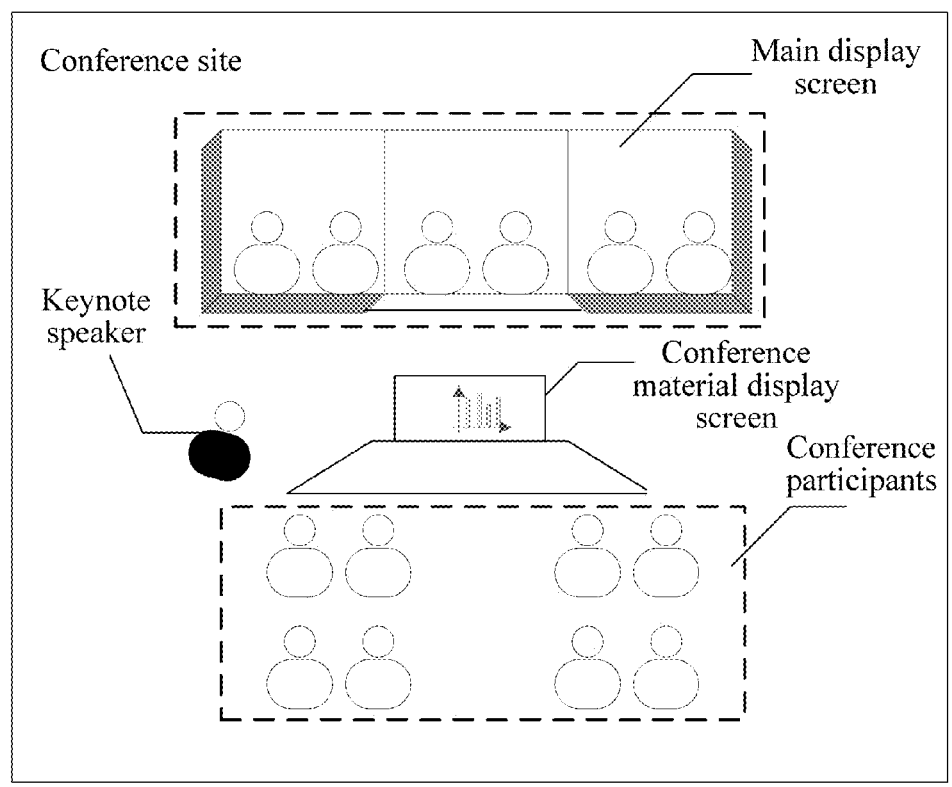
FIG. 1D is a second schematic diagram of display of a conference material in a video conference in the prior art.
Figure 2A:
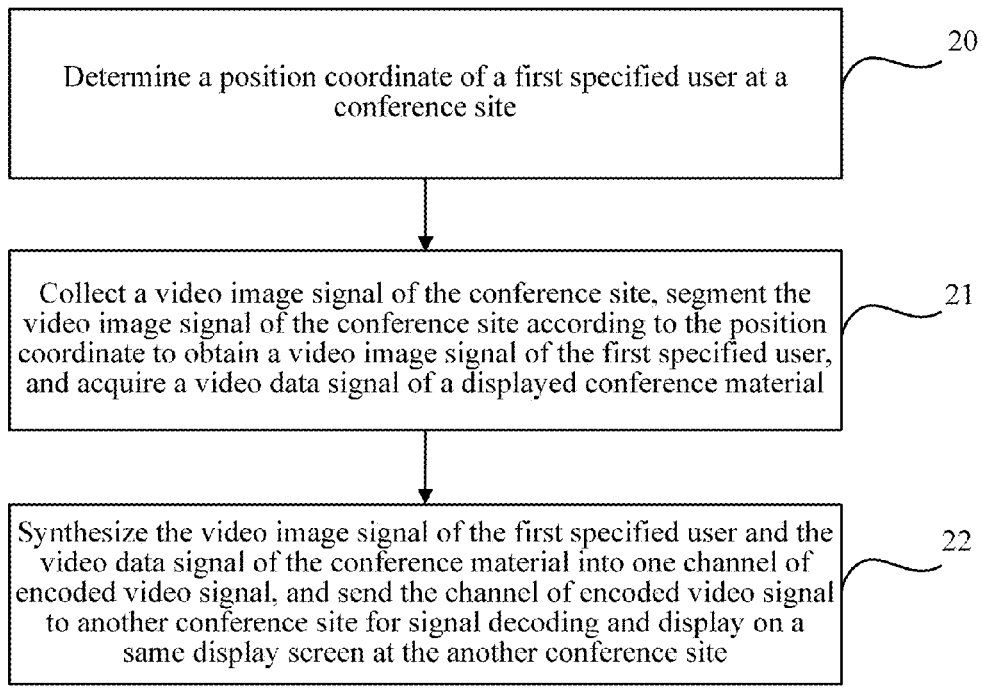
FIG. 2A is a first detailed flowchart of displaying a conference material in a video conference according to an embodiment of the present disclosure.

Referring to FIG. 2A, in the embodiments of the present disclosure, a first detailed procedure for displaying a conference material in a video conference is as follows.

Embodiment 1

Step 20: Determine a position coordinate of a first specified user at a conference site.

In this embodiment of the present disclosure, there are multiple manners for determining the position coordinate of the first specified user at the conference site. Preferably, the position coordinate of the first specified user at the conference site is determined by means of a sound localization technology; for example, sound signals of the conference site are acquired using sound signal collectors separately disposed at different positions of the conference site, and according to a collected sound signal having greatest strength, a spatial position of a signal source sending the sound signal is calculated. Alternatively, the position coordinate of the first specified user at the conference site is determined based on a locator. Positioning performed using a locator is a relatively mature technology in the prior art, and details are not described herein again.

Step 21: Collect a video image signal of the conference site, segment the video image signal of the conference site according to the position coordinate to acquire a video image signal of the first specified user, and acquire a video data signal of a displayed conference material.

In this embodiment of the present disclosure, there are multiple manners for collecting the video image signal of the conference site and segmenting, according to the position coordinate, the video image signal of the conference site to acquire the video image signal of the first specified user. Preferably, first, matching is performed between the position coordinate and spatial position coordinates of the video image signal to obtain a position of the video image signal of the first specified user in the video image signal of the conference site, and a video image of the first specified user is determined according to a video image signal at the position by means of a facial recognition technology, and then the video image signal of the conference site is segmented at a preset distance from the video image of the first specified user to acquire the video image signal of the first specified user.

In this embodiment of the present disclosure, when the video image signal of the first specified user is sent to a display screen at another conference site for displaying, video image signals of multiple second specified users at the same conference site as the first specified user may also be sent to the display screen at the another conference site for displaying. For example, position coordinates of the multiple second specified users at the conference site are first determined; then the video image signal of the conference site is segmented separately according to the determined position coordinates of the multiple second specified users to acquire a video image signal of each second specified user; and finally, the video image signals of the first specified user and the second specified users are synthesized with the video data signal of the conference material into one channel of encoded video signal. A manner used to determine the position coordinates of the second specified users at the conference site is the same as that used to determine the position coordinate of the first specified user at the conference site.

Step 22: Synthesize the video image signal of the first specified user and the video data signal of the conference material into one channel of encoded video signal, and send the channel of encoded video signal to another conference site for signal decoding and for displaying on a same display screen at the another conference site.

In this embodiment of the present disclosure, a video data signal of a conference material and a video image signal of a first specified user are synthesized into one channel of video signal and encoded, and the encoded video signal is sent to a same display screen at another conference site for presentation, thereby achieving an objective of presenting the conference material and the first specified user (for example, a keynote speaker) on a same screen. In this case, problems that a videoconferencing system cannot be moved easily and has relatively poor flexibility and relatively high maintenance costs due to presentation of the conference material and the first specified user on different display screens at a same conference site are avoided. Further, it is avoided that another conference participant who needs to pay attention to the conference material and the first specified user at the same time shifts a line of sight between a display screen presenting the conference material and a display screen presenting the first specified user in a video conference; therefore, conference efficiency and user experience are improved.

Figure 2B:
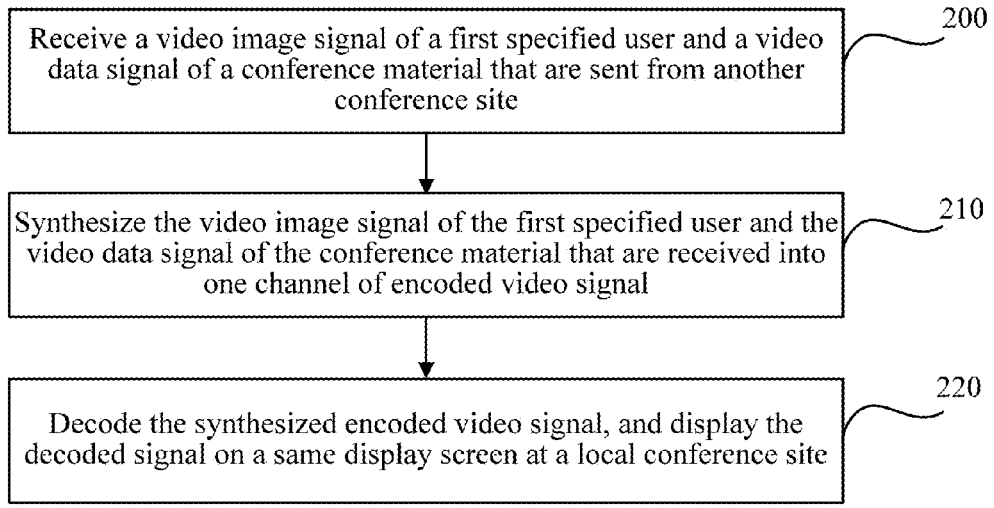
FIG. 2B is a second detailed flowchart of displaying a conference material in a video conference according to an embodiment of the present disclosure.

In the embodiments of the present disclosure, a detailed procedure for displaying a conference material in a video conference is further provided. For details, refer to FIG. 2B.

Embodiment 2

Step 200: Receive a video image signal of a first specified user and a video data signal of a conference material that are sent from another conference site.

Step 210: Synthesize, into one channel of encoded video signal, the video image signal of the first specified user and the video data signal of the conference material that are received.

Step 220: Decode the synthesized encoded video signal, and display the decoded signal on a same display screen at a local conference site.

In this embodiment of the present disclosure, when the video image signal, which is sent from the another conference site, of the first specified user is received, video image signals, which are sent from the another conference site, of multiple second specified users at the same conference site as the first specified user may also be received. There are multiple manners for processing the received video image signals of the multiple second specified users. Preferably, the received video image signal of the first specified user and the received video image signals of the second specified users are synthesized with the video data signal of the conference material into one channel of encoded video signal.

In this embodiment of the present disclosure, a video data signal of a conference material and a video image signal of a first specified user that are received are synthesized into one channel of video signal and encoded, and the encoded video signal is presented on a same display screen at a local conference site, thereby achieving an objective of presenting the conference material and the first specified user (for example, a keynote speaker) on a same screen. In this case, problems that a videoconferencing system cannot be moved easily and has relatively poor flexibility and relatively high maintenance costs due to presentation of the conference material and the first specified user on different display screens at a same conference site are avoided. Further, it is avoided that another conference participant who needs to pay attention to the conference material and the first specified user at the same time shifts a line of sight between a display screen presenting the conference material and a display screen presenting the first specified user in a video conference; therefore, conference efficiency and user experience are improved.

Figure 2C:
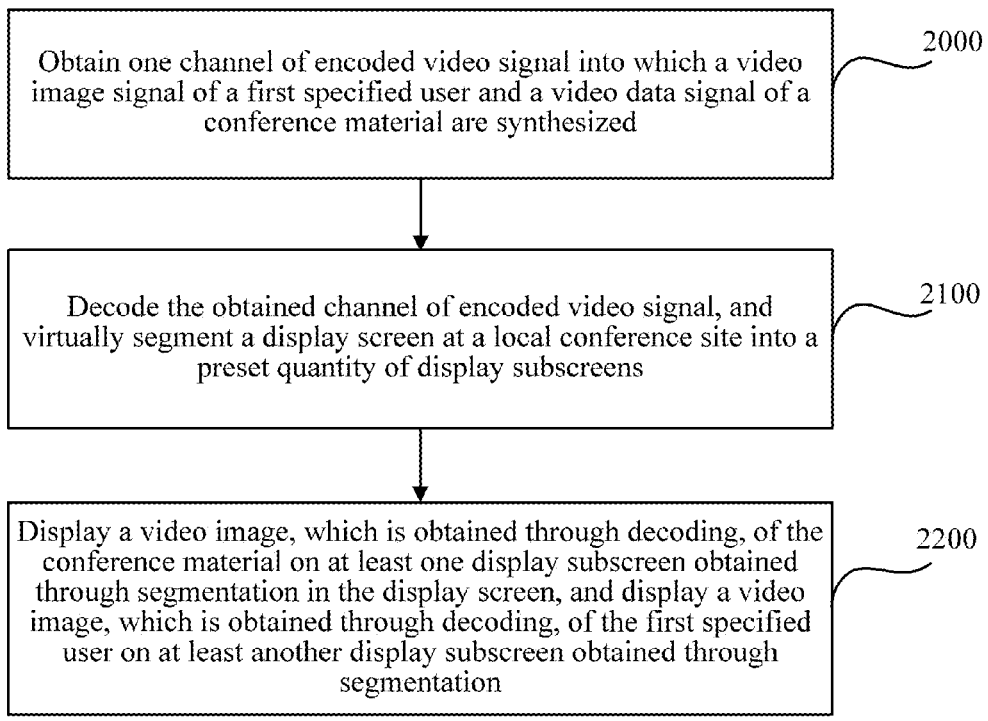
FIG. 2C is a third detailed flowchart of displaying a conference material in a video conference according to an embodiment of the present disclosure.

In the embodiments of the present disclosure, a detailed procedure for displaying a conference material in a video conference is further provided. For details, refer to FIG. 2C.

Embodiment 3

Step 2000: Obtain one channel of encoded video signal into which a video image signal of a first specified user and a video data signal of a conference material are synthesized.

In this embodiment of the present disclosure, the obtained synthesized channel of encoded video signal includes the video image signal of the first specified user, and may also include a video image signal of at least one second specified user.

Step 2100: Decode the obtained channel of encoded video signal, and virtually segment a display screen at a local conference site into a preset quantity of display subscreens.

Step 2200: Display a video image, which is obtained through decoding, of the conference material on at least one display subscreen obtained through segmentation, and display a video image, which is obtained through decoding, of the first specified user on another at least one display subscreen obtained through segmentation.

In this embodiment of the present disclosure, the obtained synthesized channel of encoded video signal includes the video image signal of the first specified user, and may also include the video image signal of the at least one second specified user. When a video image, which is obtained through decoding, of the at least one second specified user is displayed, the video image may be displayed on another at least one display subscreen that is obtained through segmentation and is different from the display subscreen displaying the conference material; that is, a display subscreen displaying a video image of a second specified user is different from the display subscreen displaying the video image of the conference material, and may be the same as or different from the display subscreen displaying the video image of the first specified user.

In this embodiment of the present disclosure, there are multiple manners for displaying the video image, which is obtained through decoding, of the conference material on the at least one display subscreen obtained through segmentation in the display screen. Preferably, the video image, which is obtained through decoding, of the conference material is displayed on at least two adjacent display subscreens obtained through segmentation in the display screen.

For example, the first specified user is a keynote speaker A, and a conference site at which A is located is a first conference site B1. A video stream, which is obtained after a video image signal of A and the video data signal of the conference material are synthesized into one channel of video signal and encoded, is sent from B1 to a second conference site B2; and at B2, after the video stream is received, a display screen C at the local conference site is first virtually segmented into 6 display subscreens, the 6 display subscreens are numbered from left to right, and two subscreens whose numbers are 2 and 3 are selected for presentation after the video data signal of the conference material is decoded. For details, refer to FIG. 3A. In an actual application, two subscreens whose numbers are 1 and 2 may also be selected for presentation, or two subscreens whose numbers are 3 and 4 may be selected for presentation, and details are not described herein again.

In this embodiment of the present disclosure, there are multiple manners for displaying the video image, which is obtained through decoding, of the specified user on the other at least one display subscreen obtained through segmentation in the display screen. For example, a video image, which is obtained through decoding, of each specified user is displayed on a display subscreen obtained through segmentation in the display screen; or video images, which are obtained through decoding, of at least two specified users are displayed on a display subscreen obtained through segmentation in the display screen.

For example, the display screen at the local conference site is virtually segmented into 6 display subscreens, and the 6 display subscreens are numbered from left to right. When the video image of the first specified user (a first specified user 1), video images of three second specified users (a second specified user 1, a second specified user 2, and a second specified user 3), and the video image of the conference material are displayed on display subscreens, the video images of the first specified user 1, the second specified user 1, the second specified user 2, the second specified user 3, and the conference material may be respectively displayed on a display subscreen 1, a display subscreen 2, a display subscreen 3, a display subscreen 4, and a display subscreen 5; or the video image of the first specified user 1 may be displayed on a display subscreen 1, the video images of the second specified user 1, the second specified user 2, and the second specified user 3 are displayed on a display subscreen 2, and the video image of the conference material is displayed on a display subscreen 3.

Further, to improve quality of presenting the conference material on the display screen, and to improve conference efficiency and user experience, in this embodiment of the present disclosure, the video image, which is obtained through decoding, of the first specified user is displayed on a display subscreen that is selected from display subscreens obtained through segmentation, and the video image, which is obtained through decoding, of the conference material is displayed on a display subscreen that is adjacent to the selected display subscreen and that is close to a central area of the display screen, and the displaying of the video images may be implemented in the following manner: virtually segmenting a display screen at the local conference site into a preset quantity of display subscreens, numbering the display subscreens according to preset order, determining a number of a display subscreen presenting the first specified user, selecting an adjacent display subscreen according to the preset order used to number the display subscreens, and decoding the video data signal of the conference material and then presenting the decoded video data signal on the adjacent display subscreen. In this way, the video image of the conference material is adjacent to the video image of the first specified user and is presented on the display subscreen close to the central area of the display screen.

For example, the first specified user is a keynote speaker A, and a conference site at which A is located is a first conference site B1. A video stream, which is obtained after a video image signal of A and the video data signal of the conference material are synthesized into one channel of video signal and encoded, is sent from B1 to a second conference site B2; and at B2, after the video stream is received, a display screen C at the local conference site is first virtually segmented into 10 display subscreens, the 10 display subscreens are numbered from left to right, and then it is determined that a number of a display subscreen presenting the first specified user is 4. The display subscreens are numbered from left to right, and the display subscreen 4 is located on the left of the display screen; therefore, after decoding is performed on the video data signal of the conference material, adjacent display subscreens (a display subscreen 5 and a display subscreen 6) to the right of the display subscreen 4 are selected to present the decoded video data signal, as shown in FIG. 3B. If a number of a display subscreen presenting the first specified user is 7, the display subscreens are numbered from left to right, and the display subscreen 7 is on the right of the display screen; therefore, after decoding is performed on the video data signal of the conference material, adjacent display subscreens (a display subscreen 5 and a display subscreen 6) to the left of the display subscreen 7 are selected to present the decoded video data signal, as shown in FIG. 3C. In this way, the display subscreen presenting the conference material is adjacent to the display subscreen presenting the first specified user and is relatively close to the central area of the display screen.

Figure 3A:
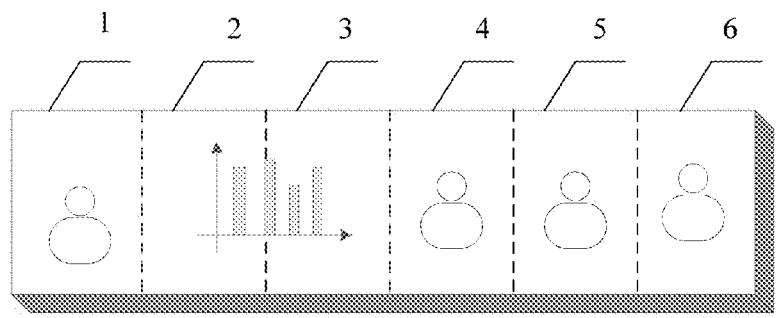
FIG. 3A is a third schematic diagram of display of a conference material in a video conference according to an embodiment of the present disclosure.
Figure 3B:
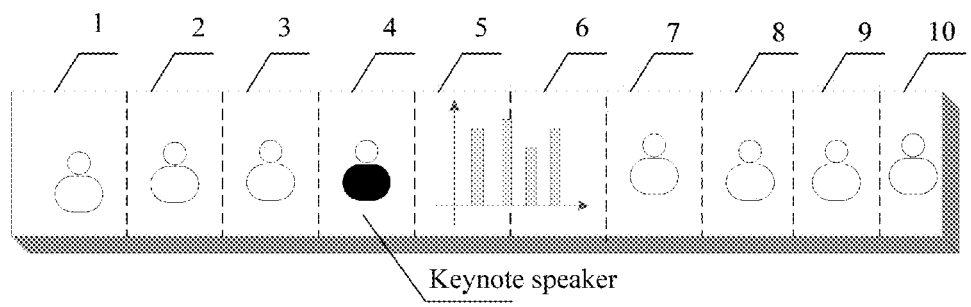
FIG. 3B is a fourth schematic diagram of display of a conference material in a video conference according to an embodiment of the present disclosure.
Figure 3C:
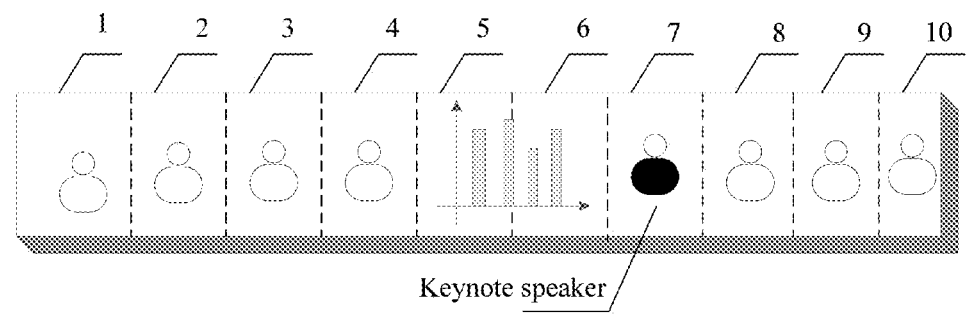
FIG. 3C is a fifth schematic diagram of display of a conference material in a video conference according to an embodiment of the present disclosure.

In an actual application, a display subscreen presenting the first specified user may change, for example, a display subscreen presenting a keynote speaker is changed from the display subscreen 2 in FIG. 3A to the display subscreen 4 in FIG. 3A. To ensure that a display subscreen presenting the conference material is adjacent to a display subscreen presenting the first specified user and is close to a central area of the display screen so as to improve quality of presenting the conference material, in this embodiment of the present disclosure, at least one display subscreen adjacent to a changed display subscreen displaying the video image of the first specified user is first determined, and then a video image in the at least one display subscreen, which originally displays the video image of the conference material, and a video image in the determined at least one display subscreen are displayed in an interchanging manner, and the displaying of the video images may be implemented in the following manner: virtually segmenting a display screen into a preset quantity of display subscreens, numbering the display subscreens according to preset order, determining, after a position of the first specified user is changed, a number of a display subscreen on which the first specified user is located, selecting an adjacent display subscreen according to the preset order used to number the display subscreens, decoding the video data signal of the conference material and then displaying the decoded video data signal on the adjacent display subscreen, and presenting a video image of the determined display subscreen on the display subscreen that originally displays the video data signal of the conference material.

Figure 4A:
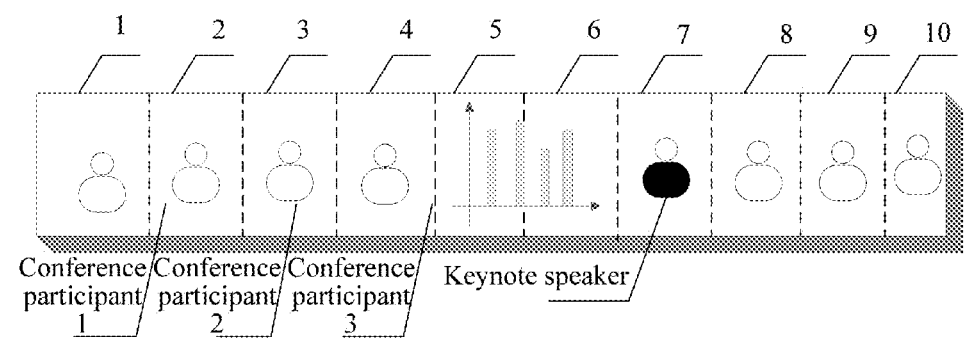
FIG. 4A is a sixth schematic diagram of display of a conference material in a video conference according to an embodiment of the present disclosure.
Figure 4B:
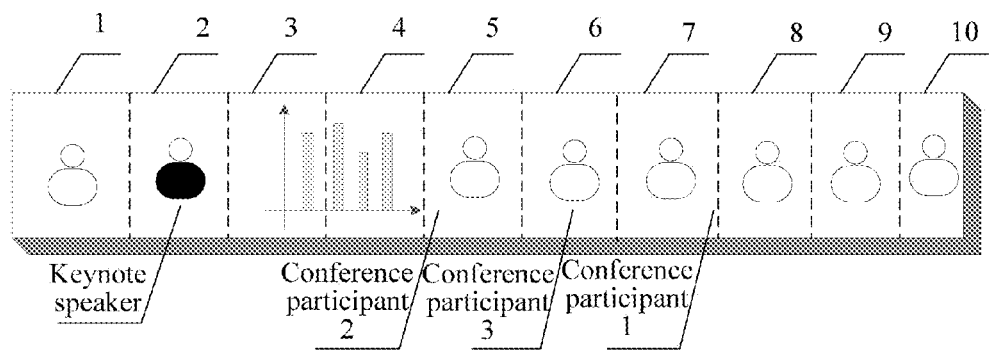
FIG. 4B is a seventh schematic diagram of display of a conference material in a video conference according to an embodiment of the present disclosure.

For example, the first specified user is a keynote speaker A, and a conference site at which A is located is a first conference site B1. A video stream, which is obtained after a video image signal of A and the video data signal of the conference material are synthesized into one channel of video signal and encoded, is sent from B1 to a second conference site B2; and at B2, after the video stream is received, a display screen at the local conference site is first virtually segmented into 10 display subscreens, and the 10 display subscreens are numbered from left to right, where a number of a display subscreen presenting the first specified user is 7, display subscreens presenting a conference participant 1, a conference participant 2, and a conference participant 3 are respectively a display subscreen 2, a display subscreen 3, and a display subscreen 4, and numbers of display subscreens presenting the conference material are 5 and 6, as shown in FIG. 4A. If the display subscreen displaying A is changed from the display subscreen 7 to the display subscreen 2, the display subscreens presenting the conference material are changed from the display subscreen 5 and the display subscreen 6 to the display subscreen 3 and the display subscreen 4, the conference participant 2 and the conference participant 3 are respectively presented on the display subscreen 5 and the display subscreen 6, and the conference participant 1 is presented on the display subscreen 7. For details, refer to FIG. 4B.

In an actual application, roles of the first specified user and a second specified user may change, for example, a keynote speaker (the first specified user) becomes a participant, and a second specified user becomes a keynote speaker. To ensure that a display subscreen presenting the conference material is adjacent to a display subscreen presenting the first specified user and is located on a side from which the display subscreen presenting the first specified user is close to a central area of the display screen so as to improve quality of presenting the conference material, in this embodiment of the present disclosure, when a role of a second specified user is changed to a role of the first specified user, at least one display subscreen adjacent to a display subscreen displaying a video image of the second specified user whose role is changed is determined, and a video image in the at least one display subscreen, which originally displays the video image of the conference material, and a video image in the determined at least one display subscreen are displayed in an interchanging manner.

Figure 4C:
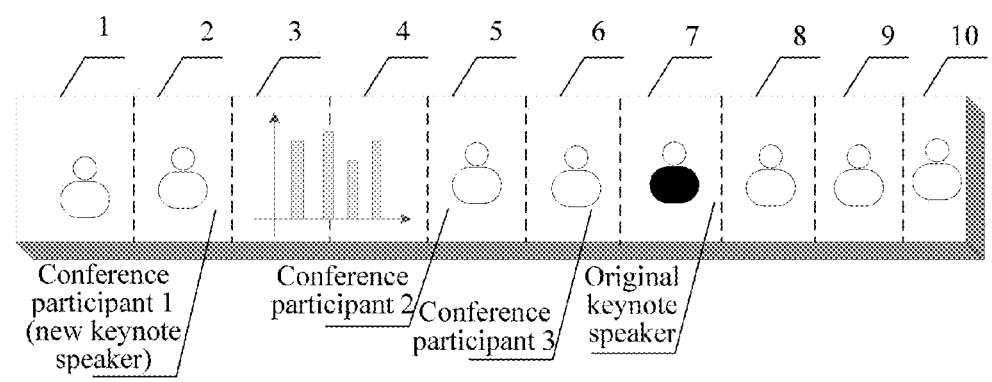
FIG. 4C is an eighth schematic diagram of display of a conference material in a video conference according to an embodiment of the present disclosure.

For example, the first specified user (a keynote speaker) is A, a conference site at which A is located is a first conference site B1, and a second specified user (a conference participant) is C. A video stream, which is obtained after a video image signal of A and the video data signal of the conference material are synthesized into one channel of video signal and encoded, is sent from B1 to a second conference site B2; and at B2, after the video stream is received, a display screen at the local conference site is first virtually segmented into 10 display subscreens, and the 10 display subscreens are numbered from left to right, where a number of a display subscreen presenting A is 7, display subscreens presenting a conference participant 1, a conference participant 2, and a conference participant 3 are respectively a display subscreen 2, a display subscreen 3, and a display subscreen 4, and numbers of display subscreens presenting the conference material are 5 and 6, as shown in FIG. 4A. If the keynote speaker is changed from A to C at present, and a display subscreen displaying C is the display subscreen 2, the display subscreens presenting the conference material are changed from the display subscreen 5 and the display subscreen 6 to the display subscreen 3 and the display subscreen 4, and the conference participant 2 and the conference participant 3 are respectively presented on the display subscreen 5 and the display subscreen 6. For details, refer to FIG. 4C.

During an actual process of a video conference, there may be a discussion stage at which another conference participant speaks. To improve user experience, in this embodiment of the present disclosure, when it is determined that a second specified user speaks, a display subscreen that is adjacent to the display subscreen displaying the video image of the conference material and that is different from the display subscreen displaying the video image of the first specified user is determined, and a video image in a display subscreen, which originally displays a video image of the second specified user who speaks, and a video image in the determined display subscreen that is adjacent to the display subscreen displaying the video image of the conference material are displayed in an interchanging manner, and the displaying of the video images may be implemented in the following manner: virtually segmenting a display screen into a preset quantity of display subscreens, numbering the display subscreens according to preset order, determining a number of a display subscreen displaying the video image signal of the conference material and a number of a display subscreen displaying the video image signal of the first specified user, and presenting the video image signal of the second specified user on a display subscreen that is on the other side of the display subscreen presenting the video data signal of the conference material.

Figure 5A:
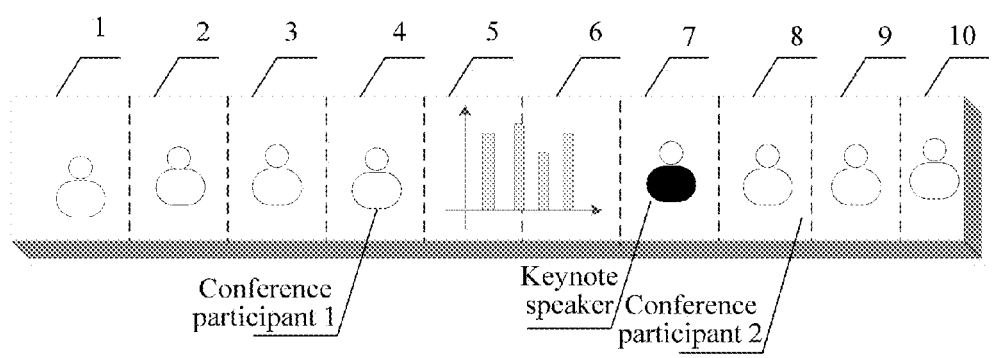
FIG. 5A is a ninth schematic diagram of display of a conference material in a video conference according to an embodiment of the present disclosure.
Figure 5B:
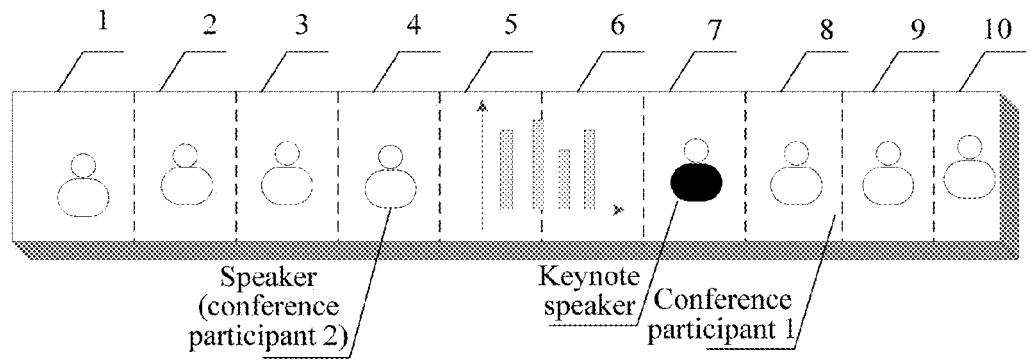
FIG. 5B is a tenth schematic diagram of display of a conference material in a video conference according to an embodiment of the present disclosure.

For example, the first specified user is a keynote speaker A, and a conference site at which A is located is a first conference site B1. A video stream, which is obtained after a video image signal of A and the video data signal of the conference material are synthesized into one channel of video signal and encoded, is sent from B1 to a second conference site B2; and at B2, after the video stream is received, a display screen at the local conference site is first virtually segmented into 10 display subscreens, and the 10 display subscreens are numbered from left to right, where a number of a display subscreen presenting the first specified user is 7, display subscreens presenting a conference participant 1 and a conference participant 2 are respectively a display subscreen 4 and a display subscreen 8, and numbers of display subscreens presenting the conference material are 5 and 6, as shown in FIG. 5A. Currently, if the conference participant 2 is a speaker, the display subscreen presenting the conference participant 2 is changed from the display subscreen 8 to the display subscreen 4, and the conference participant 1 is presented on the display subscreen 8. For details, refer to FIG. 5B.

In this embodiment of the present disclosure, there are multiple manners for presenting the first specified user on the screen. Preferably, the first specified user may be presented in highlighted form, or may be presented in animation form, or may be presented in a specified color.

In an actual application, the conference material may be displayed in a specified time period during a process of a video conference, and the conference material is not displayed in other time periods. To ensure quality of a video conference and improve conference efficiency, in this embodiment of the present disclosure, after the conference material is turned off, all video images on one side of the display subscreens presenting the conference material are presented on display subscreens whose numbers differ from initial display subscreen numbers by 2.

Figure 6A:
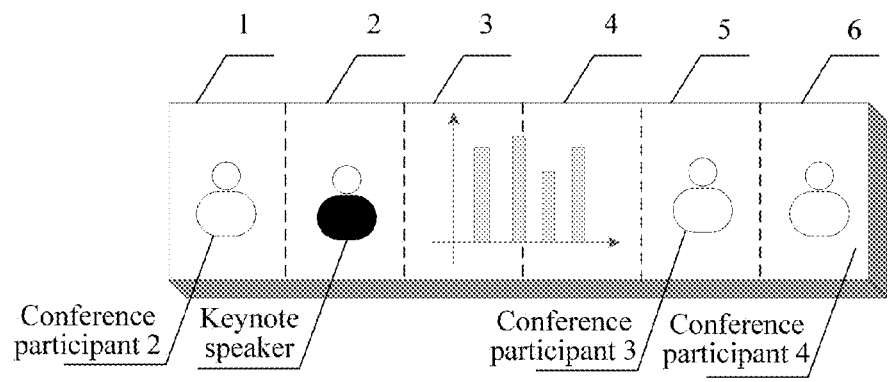
FIG. 6A is an eleventh schematic diagram of display of a conference material in a video conference according to an embodiment of the present disclosure.
Figure 6B:
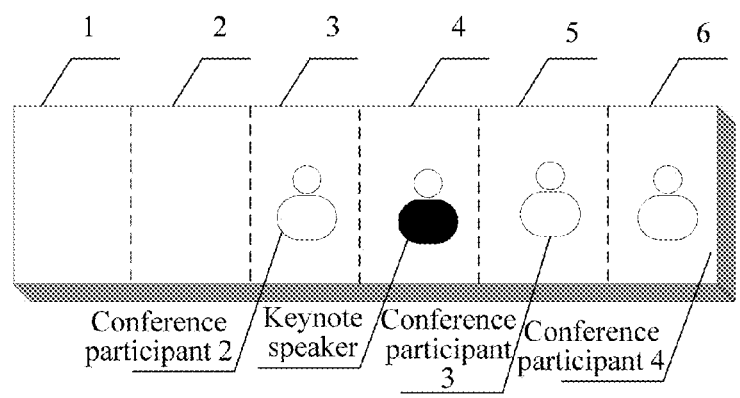
FIG. 6B is a twelfth schematic diagram of display of a conference material in a video conference according to an embodiment of the present disclosure.
Figure 6C:
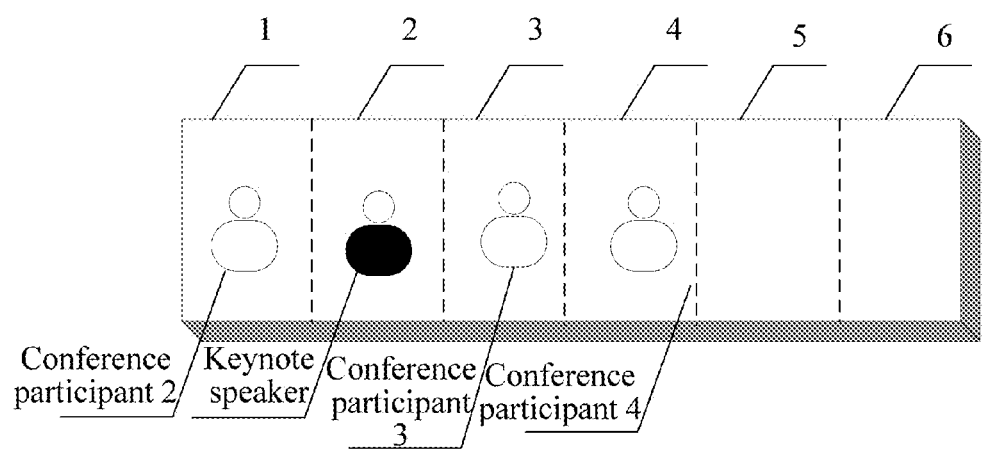
FIG. 6C is a thirteenth schematic diagram of display of a conference material in a video conference according to an embodiment of the present disclosure.

For example, the display screen is virtually divided into 6 display subscreens, the conference material is displayed on display subscreens 3 and 4, a keynote speaker is displayed on a display subscreen 2, and a conference participant 2, a conference participant 3, and a conference participant 4 are respectively displayed on a display subscreen 1, a display subscreen 5, and a display subscreen 6, as shown in FIG. 6A. After the conference material is turned off, the display subscreens displaying the conference participant 2 and the keynote speaker are respectively changed from the display subscreen 1 and the display subscreen 2 to the display subscreen 3 and the display subscreen 4, and the display subscreens presenting the conference participant 3 and the conference participant 4 are not changed, as shown in FIG. 6B; or the display subscreens displaying the conference participant 3 and the conference participant 4 are respectively changed from the display subscreen 5 and the display subscreen 6 to the display subscreen 3 and the display subscreen 4, and the display subscreens displaying the conference participant 1 and the keynote speaker are not changed, as shown in FIG. 6C.

In the solution provided in Embodiment 3, at a conference site, after one channel of encoded video signal into which a video image signal of a first specified user and a video data signal of a conference material are synthesized is obtained, a display screen at the local conference site is virtually segmented into a preset quantity of display subscreens, a video image, which is obtained through decoding, of the conference material is displayed on at least one display subscreen obtained through segmentation, and a video image, which is obtained through decoding, of the first specified user is displayed on another at least one display subscreen obtained through segmentation, thereby achieving an effect of displaying the video image of the first specified user and the video image of the conference material on a same display screen at a same conference site. Because the conference material and the first specified user are displayed on different display subscreens of only one display screen, that is, the conference material and the first specified user do not need to be displayed separately on two display screens, problems that a videoconferencing system cannot be moved easily and has relatively high costs and relatively poor flexibility due to many screens are effectively avoided. Further, when paying attention to the conference material and the first specified user at the same time, a conference participant does not need to shift a line of sight between a display screen that displays the video image of the conference material and a display screen that displays the video image of the first specified user; therefore, efficiency of a video conference is improved, and user experience is also improved.

In the embodiments of the present disclosure, Embodiment 1 and Embodiment 3 may be combined for operation, that is, a conference site on a sending end sends a synthesized signal in the manner of Embodiment 1, and a conference site on a receiving end decodes the synthesized signal and segments a display screen into subscreens for display in the manner of Embodiment 3; or Embodiment 2 and Embodiment 3 may be combined for operation, that is, a conference site on a receiving end receives signals and synthesizes the signals into one channel of signal and then decodes the synthesized channel of signal in the manner of Embodiment 2, and segments a display screen into subscreens for display in the manner of Embodiment 3. Because any one of Embodiment 1, Embodiment 2, and Embodiment 3 can resolve problems in the prior art that a videoconferencing system cannot be moved easily and has relatively poor flexibility and relatively high maintenance costs, and that conference efficiency is relatively low, an embodiment in which Embodiment 1 and Embodiment 3 are combined for operation or Embodiment 2 and Embodiment 3 are combined for operation can also resolve the problems in the prior art that a videoconferencing system cannot be moved easily and has relatively poor flexibility and relatively high maintenance costs, and that conference efficiency is relatively low. A specific analysis about how each embodiment can achieve the foregoing effect is described above, and details are not described herein again.

Figure 7:
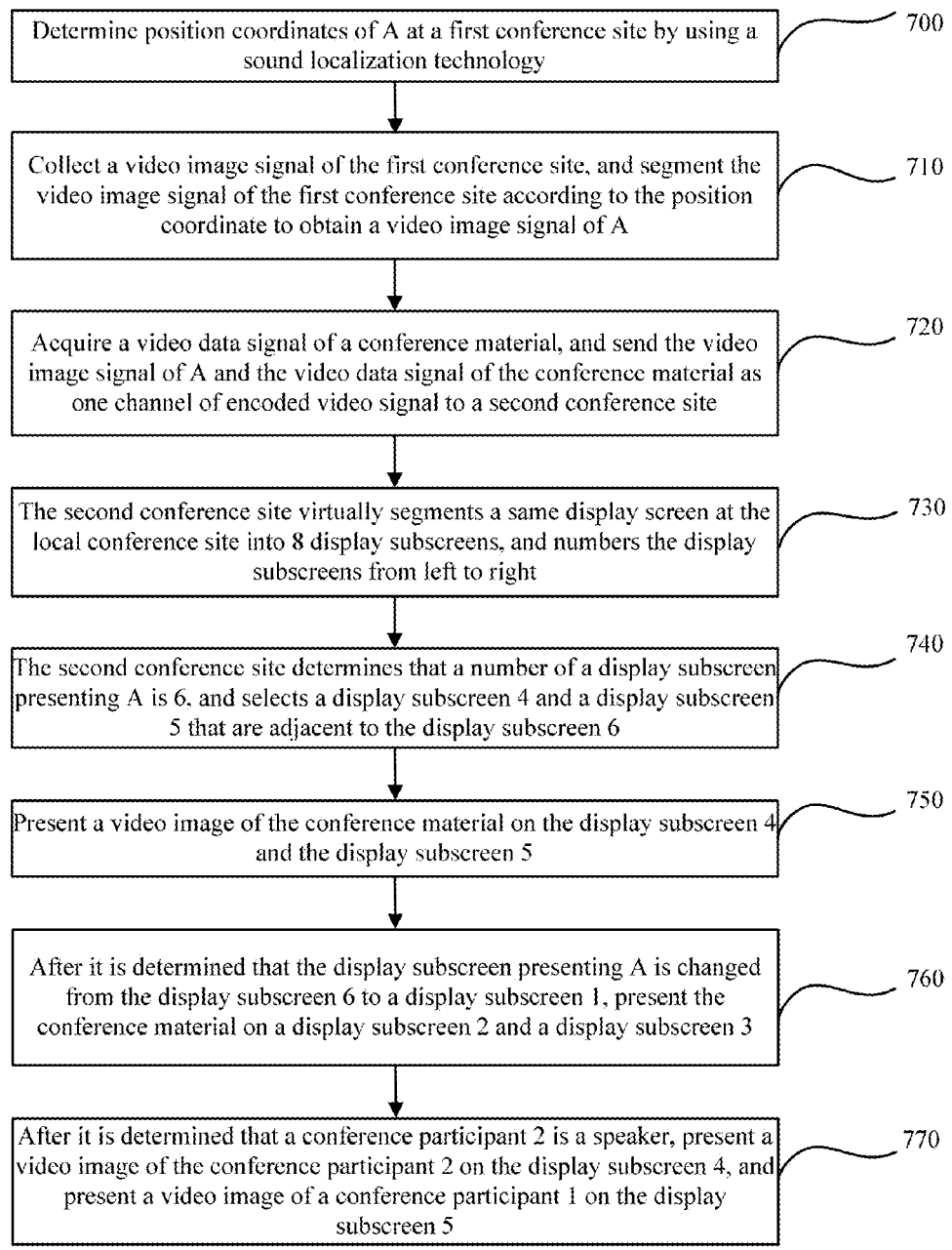
FIG. 7 is a fourth detailed flowchart of displaying a conference material in a video conference according to an embodiment of the present disclosure.

To facilitate a better understanding of the embodiments of the present disclosure, the following provides a specific application scenario, and further describes in detail a process of displaying a conference material in a remote conference. For details, refer to FIG. 7 (where A is a keynote speaker, a conference site at which A is located is a first conference site, and another conference site is a second conference site):

Step 700: Determine a position coordinate of A at a first conference site by means of a sound localization technology.

Step 710: Collect a video image signal of the first conference site, and segment the video image signal of the first conference site according to the position coordinate to acquire a video image signal of A.

Step 720: Acquire a video data signal of a conference material, and send the video image signal of A and the video data signal of the conference material as one channel of encoded video signal to a second conference site.

Step 730: At the second conference site, virtually segment a same display screen at the local conference site into 8 display subscreens, and number the display subscreens from left to right.

Step 740: At the second conference site, determine that a number of a display subscreen presenting A is 6, and select a display subscreen 4 and a display subscreen 5 that are adjacent to the display subscreen 6.

Step 750: Present a video image of the conference material on the display subscreen 4 and the display subscreen 5.

Step 760: After it is determined that the display subscreen presenting A is changed from the display subscreen 6 to a display subscreen 1, present the conference material on a display subscreen 2 and a display subscreen 3.

In this step, after the display subscreen presenting A is changed from the display subscreen 6 to the display subscreen 1, and the conference material is presented on the display subscreen 2 and the display subscreen 3, conference participants 1, 2, and 3 on the display subscreen 1, the display subscreen 2, and the display subscreen 3 are respectively displayed on the display subscreen 4, the display subscreen 5, and the display subscreen 6.

Step 770: After it is determined that a conference participant 2 is a speaker, present a video image of the conference participant 2 on the display subscreen 4, and present a video image of a conference participant 1 on the display subscreen 5.

Figure 8A:
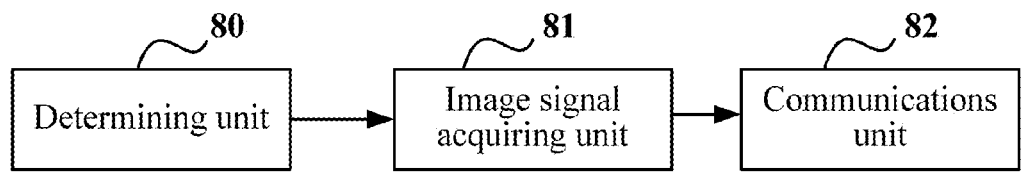
FIG. 8A is a first schematic diagram of a first display apparatus for displaying a conference material in a video conference according to an embodiment of the present disclosure.

Referring to FIG. 8A, an embodiment of the present disclosure further provides an apparatus for displaying a conference material in a video conference. The display apparatus includes a determining unit 80 configured to determine a position coordinate of a first specified user at a conference site; an image signal acquiring unit 81 configured to collect a video image signal of the conference site, segment the video image signal of the conference site according to the position coordinate determined by the determining unit 80 to acquire a video image signal of the first specified user, and acquire a video data signal of a displayed conference material; and a communications unit 82 configured to synthesize the video image signal of the first specified user and the video data signal of the conference material that are acquired by the image signal acquiring unit 81 into one channel of encoded video signal, and send the channel of encoded video signal to another conference site for signal decoding and for displaying on a same display screen at the another conference site.

Further, the determining unit 80 is further configured to determine a position coordinate of at least one second specified user, who is at the same conference site as the first specified user, at the conference site; in this case, the image signal acquiring unit 81 is further configured to segment the video image signal of the conference site according to the position coordinate, which is determined by the determining unit 80, of the at least one second specified user to acquire a video image signal of each second specified user.

Preferably, the communications unit 82 is configured to synthesize the video image signals of the first specified user and the at least one second specified user and the video data signal of the conference material that are separately acquired by the image signal acquiring unit 81 into one channel of encoded video signal, and send the channel of encoded video signal to another conference site for signal decoding and for displaying on a same display screen at the another conference site.

Preferably, the determining unit 80 is configured to determine the position coordinate of the specified user at the conference site by means of a sound localization technology; or determine, based on a locator, the position coordinate of the specified user at the conference site.

Preferably, the image signal acquiring unit 81 is configured to match the position coordinate with spatial position coordinates of the video image signal of the conference site to obtain a position of the video image signal of the specified user in the video image signal of the conference site; determine a video image of the specified user according to a video image signal at the position by means of a facial recognition technology; and segment the video image signal of the conference site at a preset distance from the image of the specified user to acquire the video image signal of the specified user.

Figure 8B:
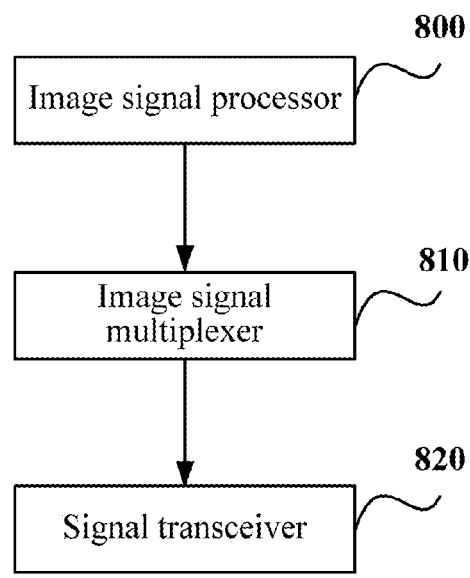
FIG. 8B is a first schematic diagram of a conference endpoint for displaying a conference material in a video conference according to an embodiment of the present disclosure.

Referring to FIG. 8B, an embodiment of the present disclosure further provides a conference endpoint. The conference endpoint includes an image signal processor 800 configured to determine a position coordinate of a first specified user at a conference site, collect a video image signal of the conference site, segment the video image signal of the conference site according to the position coordinate to acquire a video image signal of the first specified user, and acquire a video data signal of a displayed conference material; an image signal multiplexer 810 configured to synthesize the video image signal of the first specified user and the video data signal of the conference material that are acquired by the image signal processor 800 into one channel of encoded video signal; and a signal transceiver 820 configured to send the channel of encoded video signal synthesized by the image signal multiplexer 810 to another conference site for signal decoding and for displaying on a same display screen at the another conference site.

Preferably, the image signal processor 800 is further configured to determine a position coordinate of at least one second specified user, who is at the same conference site as the first specified user, at the conference site; and segment the video image signal of the conference site according to the determined the position coordinate of the at least one second specified user to acquire a video image signal of each second specified user; and the image signal multiplexer 810 is configured to synthesize the video image signals of the first specified user and the at least one second specified user and the video data signal of the conference material that are separately acquired by the image signal processor 800 into one channel of encoded video signal.

Preferably, the image signal processor 800 is configured to determine the position coordinate of the specified user at the conference site by means of a sound localization technology; or determine, based on a locator, the position coordinate of the specified user at the conference site.

Preferably, the image signal processor 800 is configured to match the position coordinate with spatial position coordinates of the video image signal of the conference site to obtain a position of the video image signal of the specified user in the video image signal of the conference site; determine a video image of the specified user according to a video image signal at the position by means of a facial recognition technology; and segment the video image signal of the conference site at a preset distance from the image of the specified user to acquire the video image signal of the specified user.

Figure 9A:
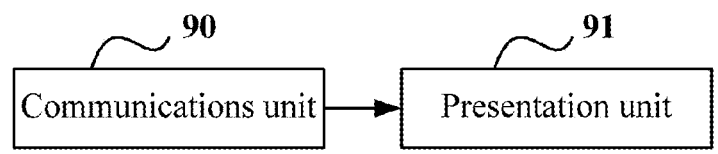
FIG. 9A is a second schematic diagram of a display apparatus for displaying a conference material in a video conference according to an embodiment of the present disclosure.

Referring to FIG. 9A, an embodiment of the present disclosure further provides an apparatus for displaying a conference material in a video conference. The display apparatus includes a communications unit 90 configured to receive a video image signal of a first specified user and a video data signal of a conference material that are sent from another conference site, and synthesize, into one channel of encoded video signal, the video image signal of the first specified user and the video data signal of the conference material that are received; and a presentation unit 91 configured to decode the encoded video signal synthesized by the communications unit 90, and display the decoded signal on a same display screen at a local conference site.

Further, the communications unit 90 is further configured to receive a video image signal, which is sent from the another conference site, of at least one second specified user at the same conference site as the first specified user, and synthesize the received video image signal of the at least one second specified user into the synthesized channel of encoded video signal.

Figure 9B:
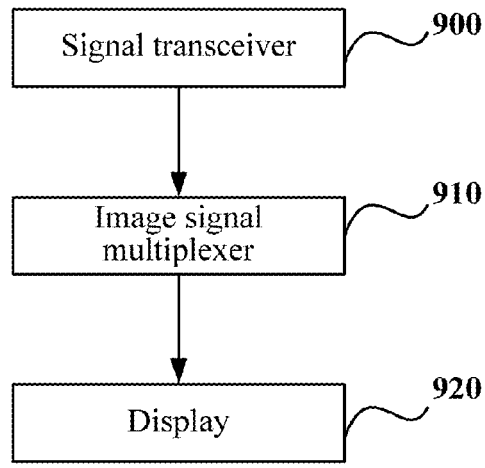
FIG. 9B is a second schematic diagram of a conference endpoint for displaying a conference material in a video conference according to an embodiment of the present disclosure.

Referring to FIG. 9B, an embodiment of the present disclosure further provides a conference endpoint. The conference endpoint includes a signal transceiver 900 configured to receive a video image signal of a first specified user and a video data signal of a conference material that are sent from another conference site; an image signal multiplexer 910 configured to synthesize, into one channel of encoded video signal, the video image signal of the first specified user and the video data signal of the conference material that are received by the signal transceiver 900; and a display 920 configured to decode the encoded video signal synthesized by the image signal multiplexer 910, and display the decoded signal on a same display screen at a local conference site.

Further, the signal transceiver 900 is further configured to receive a video image signal, which is sent from the other conference site, of at least one second specified user at the same conference site as the first specified user.

When the signal transceiver 900 further receives the video image signal of the at least one second specified user, the image signal multiplexer 910 is configured to synthesize, into one channel of encoded video signal, the video image signals of the first specified user and the at least one second specified user and the video data signal of the conference material that are received by the signal transceiver 900.

Figure 10A:
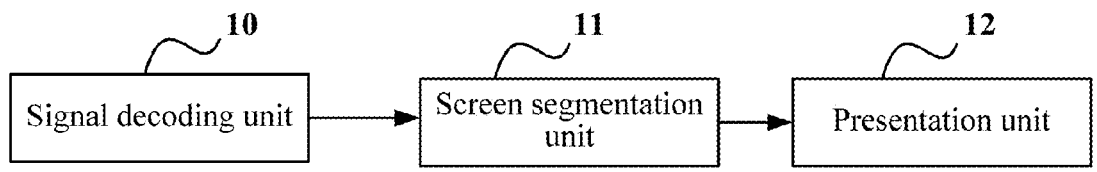
FIG. 10A is a third schematic diagram of a display apparatus for displaying a conference material in a video conference according to an embodiment of the present disclosure.

Referring to FIG. 10A, an embodiment of the present disclosure further provides an apparatus for displaying a conference material in a video conference. The display apparatus includes a signal decoding unit 10 configured to obtain one channel of encoded video signal into which a video image signal of a first specified user and a video data signal of a conference material are synthesized, and decode the obtained channel of encoded video signal; a screen segmentation unit 11 configured to virtually segment a display screen at a local conference site into a preset quantity of display subscreens; and a presentation unit 12 configured to display a video image, which is obtained by the signal decoding unit 10 through decoding, of the conference material on at least one display subscreen obtained by the screen segmentation unit 11 through segmentation, and display a video image, which is obtained by the signal decoding unit 10 through decoding, of the first specified user on another at least one display subscreen obtained by the screen segmentation unit 11 through segmentation.

Further, the channel of encoded video signal obtained by the signal decoding unit 10 further includes a video image signal of at least one second specified user; in this case, the presentation unit 12 is further configured to display a video image, which is obtained by the signal decoding unit 10 through decoding, of the at least one second specified user on another at least one display subscreen obtained by the screen segmentation unit 11 through segmentation.

Preferably, the presentation unit 12 is configured to display the video image, which is obtained by the signal decoding unit 10 through decoding, of the conference material on at least two adjacent display subscreens obtained by the screen segmentation unit 11 through segmentation.

Preferably, the presentation unit 12 is configured to display a video image, which is obtained by the signal decoding unit 10 through decoding, of each specified user on any display subscreen obtained by the screen segmentation unit 11 through segmentation; or display video images, which are obtained by the signal decoding unit 10 through decoding, of at least two specified users on any display subscreen obtained by the screen segmentation unit 11 through segmentation.

Preferably, the presentation unit 12 is configured to display the video image, which is obtained by the signal decoding unit 10 through decoding, of the first specified user on any display subscreen obtained by the screen segmentation unit 11 through segmentation; and display the video image, which is obtained by the signal decoding unit 10 through decoding, of the conference material on a display subscreen that is adjacent to the selected display subscreen and is close to a central area of the display screen.

Further, the presentation unit 12 is further configured to, when a role of a second specified user is changed to a role of the first specified user, determine at least one display subscreen adjacent to a display subscreen displaying a video image of the second specified user whose role is changed; and display, in an interchanging manner, a video image in the at least one display subscreen, which originally displays the video image of the conference material, and a video image in the determined at least one display subscreen.

Further, the presentation unit 12 is further configured to, when a second specified user speaks, determine at least one display subscreen that is adjacent to the display subscreen displaying the video image of the conference material and is different from the display subscreen displaying the video image of the first specified user; and display, in an interchanging manner, a video image in a display subscreen, which originally displays a video image of the second specified user who speaks, and a video image in the determined at least one display subscreen.

Figure 10B:
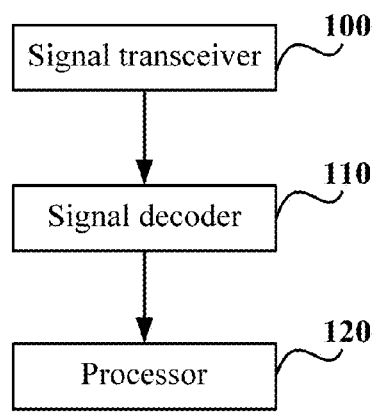
FIG. 10B is a third schematic diagram of a conference endpoint for displaying a conference material in a video conference according to an embodiment of the present disclosure.

Referring to FIG. 10B, an embodiment of the present disclosure further provides a conference endpoint. The conference endpoint includes a signal transceiver 100 configured to obtain one channel of encoded video signal into which a video image signal of a first specified user and a video data signal of a conference material are synthesized; a signal decoder 110 configured to decode the channel of encoded video signal obtained by the signal transceiver 100; and a processor 120 configured to virtually segment a display screen at a local conference site into a preset quantity of display subscreens; display a video image, which is obtained by the signal decoder 110 through decoding, of the conference material on at least one display subscreen obtained through segmentation; and display a video image, which is obtained by the signal decoder 110 through decoding, of the first specified user on another at least one display subscreen obtained through segmentation.

Further, the channel of encoded video signal obtained by the signal transceiver 100 further includes a video image signal of at least one second specified user; in this case, the processor 120 is further configured to display a video image, which is obtained by the signal decoder 110 through decoding, of the at least one second specified user on another at least one display subscreen obtained by the processor 120 through segmentation.

Preferably, the processor 120 is configured to display the video image, which is obtained by the signal decoder 110 through decoding, of the conference material on at least two adjacent display subscreens obtained through segmentation.

Preferably, the processor 120 is configured to display a video image, which is obtained by the signal decoder 110 through decoding, of each specified user on any display subscreen obtained through segmentation; or display video images, which are obtained by the signal decoder 110 through decoding, of at least two specified users on any display subscreen obtained through segmentation.

Preferably, the processor 120 is configured to display the video image, which is obtained by the signal decoder 110 through decoding, of the first specified user on any display subscreen obtained through segmentation; and display the video image, which is obtained by the signal decoder 110 through decoding, of the conference material on a display subscreen that is adjacent to the selected display subscreen and is close to a central area of the display screen.

Further, the processor 120 is further configured to, when a role of a second specified user is changed to a role of the first specified user, determine at least one display subscreen adjacent to a display subscreen displaying a video image of the second specified user whose role is changed; and display, in an interchanging manner, a video image in the at least one display subscreen, which originally displays the video image of the conference material, and a video image in the determined at least one display subscreen.

Further, the processor 120 is further configured to, when a second specified user speaks, determine at least one display subscreen that is adjacent to the display subscreen displaying the video image of the conference material and is different from the display subscreen displaying the video image of the first specified user; and display, in an interchanging manner, a video image in a display subscreen, which originally displays a video image of the second specified user who speaks, and a video image in the determined at least one display subscreen.

In conclusion, in the embodiments of the present disclosure, three methods for displaying a conference material in a remote conference are provided.

One method includes first determining position coordinates of a first specified user at a conference site, then collecting a video image signal of the conference site, and segmenting, according to the position coordinates, the video image signal of the conference site to acquire a video image signal of the first specified user; and then acquiring a video data signal of a displayed conference material, synthesizing the video image signal of the first specified user and the video data signal of the conference material into one channel of encoded video signal, and sending the channel of encoded video signal to another conference site for signal decoding and for displaying on a same display screen at the another conference site. In this solution, the video image signal of the first specified user and the video data signal of the conference material that are acquired are synthesized into one channel of video signal and encoded, and then the encoded video signal is sent to the another conference site and is displayed on the same display screen at the another conference site, thereby achieving an effect of displaying a video image of the first specified user and a video image of the conference material on a same display screen at a same conference site. Because only one display screen is required to display the conference material and the first specified user at the same time, problems that a videoconferencing system cannot be moved easily and has relatively high costs and relatively poor flexibility are effectively avoided. Further, when paying attention to the conference material and the first specified user at the same time, a conference participant does not need to shift a line of sight between a display screen that displays the video image of the conference material and a display screen that displays the video image of the first specified user; therefore, efficiency of a video conference is improved, and user experience is also improved. Another method includes, after a video image signal of a first specified user and a video data signal of a conference material that are sent from another conference site are received, synthesizing, into one channel of encoded video signal, the video image signal of the first specified user and the video data signal of the conference material that are received, decoding the synthesized channel of encoded video signal, and displaying the decoded video signal on a same display screen at a local conference site. In this solution, at a conference site, the video image signal of the first specified user and the video data signal of the conference material that are received are synthesized into one channel of video signal and encoded, and the encoded video signal is displayed on the same display screen at the local conference site, thereby achieving an effect of displaying a video image of the first specified user and a video image of the conference material on a same display screen at a same conference site. Because only one display screen is required to display the conference material and the first specified user at the same time, that is, the conference material and the first specified user do not need to be displayed separately on two display screens, problems that a videoconferencing system cannot be moved easily and has relatively high costs and relatively poor flexibility due to many screens are effectively avoided. Further, when paying attention to the conference material and the first specified user at the same time, a conference participant does not need to shift a line of sight between a display screen that displays the video image of the conference material and a display screen that displays the video image of the first specified user; therefore, efficiency of a video conference is improved, and user experience is also improved. Still another method includes obtaining one channel of encoded video signal into which a video image signal of a first specified user and a video data signal of a conference material are synthesized; decoding the obtained synthesized channel of encoded video signal, and virtually segmenting a display screen at a local conference site into a preset quantity of display subscreens; and displaying a video image, which is obtained through decoding, of the conference material on at least one display subscreen obtained through segmentation, and displaying a video image, which is obtained through decoding, of the first specified user on another at least one display subscreen obtained through segmentation. In this solution, at a conference site, after the channel of encoded video signal into which the video image signal of the first specified user and the video data signal of the conference material are synthesized is obtained, a display screen at the local conference site is virtually segmented into a preset quantity of display subscreens, the video image, which is obtained through decoding, of the conference material is displayed on at least one display subscreen obtained through segmentation, and the video image, which is obtained through decoding, of the first specified user is displayed on another at least one display subscreen obtained through segmentation, thereby achieving an effect of displaying a video image of the first specified user and a video image of the conference material on a same display screen at a same conference site. Because the conference material and the first specified user are displayed on different display subscreens of only one display screen, that is, the conference material and the first specified user do not need to be displayed separately on two display screens, problems that a videoconferencing system cannot be moved easily and has relatively high costs and relatively poor flexibility due to many screens are effectively avoided. Further, when paying attention to the conference material and the first specified user at the same time, a conference participant does not need to shift a line of sight between a display screen that displays the video image of the conference material and a display screen that displays the video image of the first specified user; therefore, efficiency of a video conference is improved, and user experience is also improved.

The present disclosure is described with reference to the flowcharts and/or block diagrams of the method, the device (system), and the computer program product according to the embodiments of the present disclosure. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a function in one or more procedures in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a function in one or more procedures in the flowcharts and/or in one or more blocks in the block diagrams.

These computer program instructions may also be loaded onto a computer or another programmable data processing device, so that a series of operations and steps are performed on the computer or the other programmable device, thereby generating computer-implemented processing. Therefore, the instructions executed on the computer or the another programmable device provide steps for implementing a function in one or more procedures in the flowcharts and/or in one or more blocks in the block diagrams.

Although some preferred embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

Obviously, persons skilled in the art can make various modifications and variations to the embodiments of the present disclosure without departing from the spirit and scope of the embodiments of the present disclosure. The present disclosure is intended to cover these modifications and variations provided that they fall within the scope defined by the following claims and their equivalent technologies.

What is claimed is:

1. A method for displaying a conference material in a video conference, comprising:
    determining a first position coordinate of a first specified user at a conference site using a sound localization technology;
    determining a second position coordinate of at least one second specified user at the conference site using the sound localization technology;
    collecting a video image signal of the conference site;
    segmenting the video image signal of the conference site according to the first position coordinate to acquire a video image signal of the first specified user;
    segmenting the video image signal of the conference site according to the second position coordinate to acquire a video image signal of the at least one second specified user;
    acquiring a video data signal of a displayed conference material;
    synthesizing the video image signals of the first specified user and the at least one second specified user, and the video data signal of the conference material into one channel of encoded video signal; and
    sending the channel of encoded video signal to a second conference site for signal decoding and for displaying on a same display screen at the second conference site.

2. The method according to claim 1, wherein segmenting the video image signal of the conference site according to the first position coordinate to acquire the video image signal of the first specified user comprises:
    matching the first position coordinate with spatial position coordinates of the video image signal of the conference site to obtain a position of the video image signal of the first specified user in the video image signal of the conference site;
    determining a video image of the first specified user according to a video image signal at the position using a facial recognition technology; and
    segmenting the video image signal of the conference site from the video image of the first specified user to acquire the video image signal of the first specified user.

3. A method for displaying a conference material in a video conference, comprising:
    obtaining one channel of encoded video signal into which a video image signal of a first specified user, a video image signal of at least one second specified user, and a video data signal of a conference material are synthesized;
    decoding the obtained channel of encoded video signal;
    virtually segmenting a display screen at a local conference site into a preset quantity of display subscreens;
    displaying a video image, which is obtained through decoding, of the conference material on at least one display subscreen obtained through segmentation in the display screen;
    displaying a video image, which is obtained through decoding, of the first specified user on a second display subscreen obtained through segmentation in the display screen; and
    displaying a video image, which is obtained through decoding, of the at least one second specified user on at least a third display subscreen obtained through segmentation in the display screen.

4. The method according to claim 3, wherein displaying the video image of the conference material on the at least one display subscreen obtained through segmentation in the display screen comprises displaying the video image, which is obtained through decoding, of the conference material on at least two adjacent display subscreens obtained through segmentation in the display screen.

5. The method according to claim 3, wherein displaying the video image of the first specified user on the second display subscreen obtained through segmentation in the display screen comprises displaying the video image, which is obtained through decoding, of each specified user on an individual display subscreen obtained through segmentation in the display screen.

6. The method according to claim 3, wherein displaying the video image of the conference material on the at least one display subscreen obtained through segmentation in the display screen, and displaying the video image, which is obtained through decoding, of the first specified user on the second display subscreen obtained through segmentation in the display screen comprises:

displaying the video image, which is obtained through decoding, of the first specified user on a display subscreen that is selected from all display subscreens and that is obtained through segmentation in the display screen; and displaying the video image, which is obtained through decoding, of the conference material on a display subscreen that is adjacent to the selected display subscreen.

7. The method according to claim 3, further comprising:
determining, when a role of a specified user of the at least one second specified user is changed to a role of the first specified user, at least one display subscreen adjacent to a display subscreen displaying a video image of the second specified user whose role is changed; and displaying, in an interchanging manner, a video image in the at least one display subscreen, which originally displays the video image of the conference material, and a video image of the specified user in the determined at least one display subscreen.

8. The method according to claim 3, further comprising:
determining, when a specified user of the at least one second specified user speaks, at least one display subscreen that is adjacent to the display subscreen displaying the video image of the conference material and is different from the second display subscreen displaying the video image of the first specified user; and displaying, in an interchanging manner, a video image in a display subscreen, which originally displays a video image of the second specified user who speaks, and a video image in the determined at least one display subscreen.

9. A conference endpoint, comprising:
an image signal processor configured to:
determine a first position coordinate of a first specified user at a conference site using a sound localization technology;
determine a second position coordinate of at least one second specified user at the conference site using the sound localization technology;
collect a video image signal of the conference site;
segment the video image signal of the conference site according to the first position coordinate to acquire a video image signal of the first specified user;
segment the video image signal of the conference site according to the second position coordinate of the at least one second specified user to acquire a video image signal of the at least one second specified user, and
acquire a video data signal of a conference material;
an image signal multiplexer configured to synthesize the video image signals of the first specified user and the at least one second specified user, and the video data signal of the conference material that are acquired by the image signal processor into one channel of encoded video signal; and
a signal transceiver configured to send the channel of encoded video signal synthesized by the image signal multiplexer to another conference site for signal decoding and for displaying on a same display screen at the another conference site.

10. The conference endpoint according to claim 9, wherein the image signal processor is configured to:
match the first position coordinate with spatial position coordinates of the video image signal of the conference site to obtain a position of the video image signal of the first specified user in the video image signal of the conference site;
determine a video image of the first specified user according to a video image signal at the position by means of a facial recognition technology; and
segment the video image signal of the conference site from the video image of the first specified user to acquire the video image signal of the first specified user.

11. A conference endpoint, comprising:
a signal transceiver configured to obtain one channel of encoded video signal into which a video image signal of a first specified user, a video image signal of at least one second specified user, and a video data signal of a conference material are synthesized;
a signal decoder configured to decode the channel of encoded video signal obtained by the signal transceiver; and
a processor configured to:
virtually segment a display screen at a local conference site into a preset quantity of display subscreens;
display a video image, which is obtained by the signal decoder through decoding, of the conference material on at least one display subscreen obtained through segmentation;
display a video image, which is obtained by the signal decoder through decoding, of the first specified user on a second display subscreen obtained through segmentation; and
display a video image, which is obtained by the signal decoder through decoding, of the at least one second specified user on a third display subscreen obtained through segmentation.

12. The conference endpoint according to claim 11, wherein the processor is further configured to display the video image, which is obtained by the signal decoder through decoding, of the conference material on at least two adjacent display subscreens obtained through segmentation.

13. The conference endpoint according to claim 11, wherein the processor is further configured to display a video image, which is obtained by the signal decoder through decoding, of each specified user on an individual display subscreen obtained through segmentation.

14. The conference endpoint according to claim 11, wherein the processor is further configured to:
display the video image, which is obtained by the signal decoder through decoding, of the first specified user on any display subscreen obtained through segmentation; and
display the video image, which is obtained by the signal decoder through decoding, of the conference material on a display subscreen that is adjacent to a selected display subscreen.

15. The conference endpoint according to claim 11, wherein the first specified user is displayed in a highlighted form.

16. The conference endpoint according to claim 11, wherein the first specified user is displayed in an animation form.

17. The conference endpoint according to claim 11, wherein the first specified user is displayed in a specified color.

* * * * *